US 11,455,136 B2

(12) United States Patent
Tokuchi

(10) Patent No.: US 11,455,136 B2
(45) Date of Patent: Sep. 27, 2022

(54) INFORMATION PROCESSING APPARATUS AND NON-TRANSITORY COMPUTER READABLE MEDIUM

(71) Applicant: FUJIFILM BUSINESS INNOVATION CORP., Tokyo (JP)

(72) Inventor: Kengo Tokuchi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 201 days.

(21) Appl. No.: 16/445,391

(22) Filed: Jun. 19, 2019

(65) Prior Publication Data

US 2020/0012468 A1 Jan. 9, 2020

(30) Foreign Application Priority Data

Jul. 3, 2018 (JP) .............................. JP2018-126922

(51) Int. Cl.
*G06F 3/12* (2006.01)
*H04N 1/00* (2006.01)
*G06F 9/50* (2006.01)

(52) U.S. Cl.
CPC .......... *G06F 3/1275* (2013.01); *G06F 3/1285* (2013.01); *G06F 9/5038* (2013.01); *H04N 1/00209* (2013.01); *H04N 1/00949* (2013.01); *H04N 1/00952* (2013.01); *H04N 2201/3202* (2013.01)

(58) Field of Classification Search
CPC .............................. G06F 3/1275; G06F 3/1285
See application file for complete search history.

(56) References Cited

U.S. PATENT DOCUMENTS

| 9,137,393 | B2 | 9/2015 | Sato | |
| 2005/0144161 | A1* | 6/2005 | Hirota | ..................... G06F 9/451 |
| 2005/0270566 | A1* | 12/2005 | Tanaka | ............... H04N 1/00413 |
| | | | | 358/1.15 |
| 2010/0211951 | A1 | 8/2010 | Ito | |
| 2018/0104816 | A1* | 4/2018 | Tokuchi | ................ B25J 9/1679 |

FOREIGN PATENT DOCUMENTS

| JP | H09-026942 | A | 1/1997 |
| JP | 2004-151898 | A | 5/2004 |
| JP | 2010-187199 | A | 8/2010 |
| JP | 2011-166748 | A | 8/2011 |
| JP | 2014-078883 | A | 5/2014 |
| JP | 2017-021656 | A | 1/2017 |
| JP | 2018-006882 | A | 1/2018 |
| JP | 2018-067139 | A | 4/2018 |
| WO | 2011/099075 | A1 | 8/2011 |

OTHER PUBLICATIONS

Feb. 1, 2022 Office Action issued in Japanese Patent Application No. 2018-126922.

* cited by examiner

*Primary Examiner* — Ibrahim Siddo
(74) *Attorney, Agent, or Firm* — Oliff PLC

(57) ABSTRACT

An information processing apparatus includes a control unit. The control unit changes between a first setting and a second setting of a collaborative function, the second setting being different from the first setting, at least one of a display position of an image and display of connection between images, the image and the images each being associated with a function to be used for the collaborative function.

17 Claims, 19 Drawing Sheets

FIG. 3

| CONFIGURATION | FUNCTION | OUTPUT DETAILS |
|---|---|---|
| SENSOR A | TEMPERATURE DETECTION FUNCTION, HUMIDITY DETECTION FUNCTION, PRESSURE DETECTION FUNCTION, ... | TEMPERATURE DATA, HUMIDITY DATA, PRESSURE DATA, ... |
| MULTI-FUNCTION PERIPHERAL B | SCAN FUNCTION, PRINT FUNCTION, COPY FUNCTION, ... | IMAGE DATA, PRINTED MATERIALS, ... |
| ROBOT C | CONVEY FUNCTION, IMAGING FUNCTION, CONVERSATION FUNCTION, SEARCH FUNCTION, ... | IMAGE DATA, AUDIO DATA, ... |
| APPLICATION 1 | STATISTICS COLLECTING FUNCTION, ... | STATISTICS DATA, ... |
| APPLICATION 2 | DOCUMENT CREATING FUNCTION, ... | DOCUMENT DATA, ... |
| APPLICATION 3 | IMAGE PROCESSING FUNCTION, ... | IMAGE DATA, ... |
| ... | ... | ... |

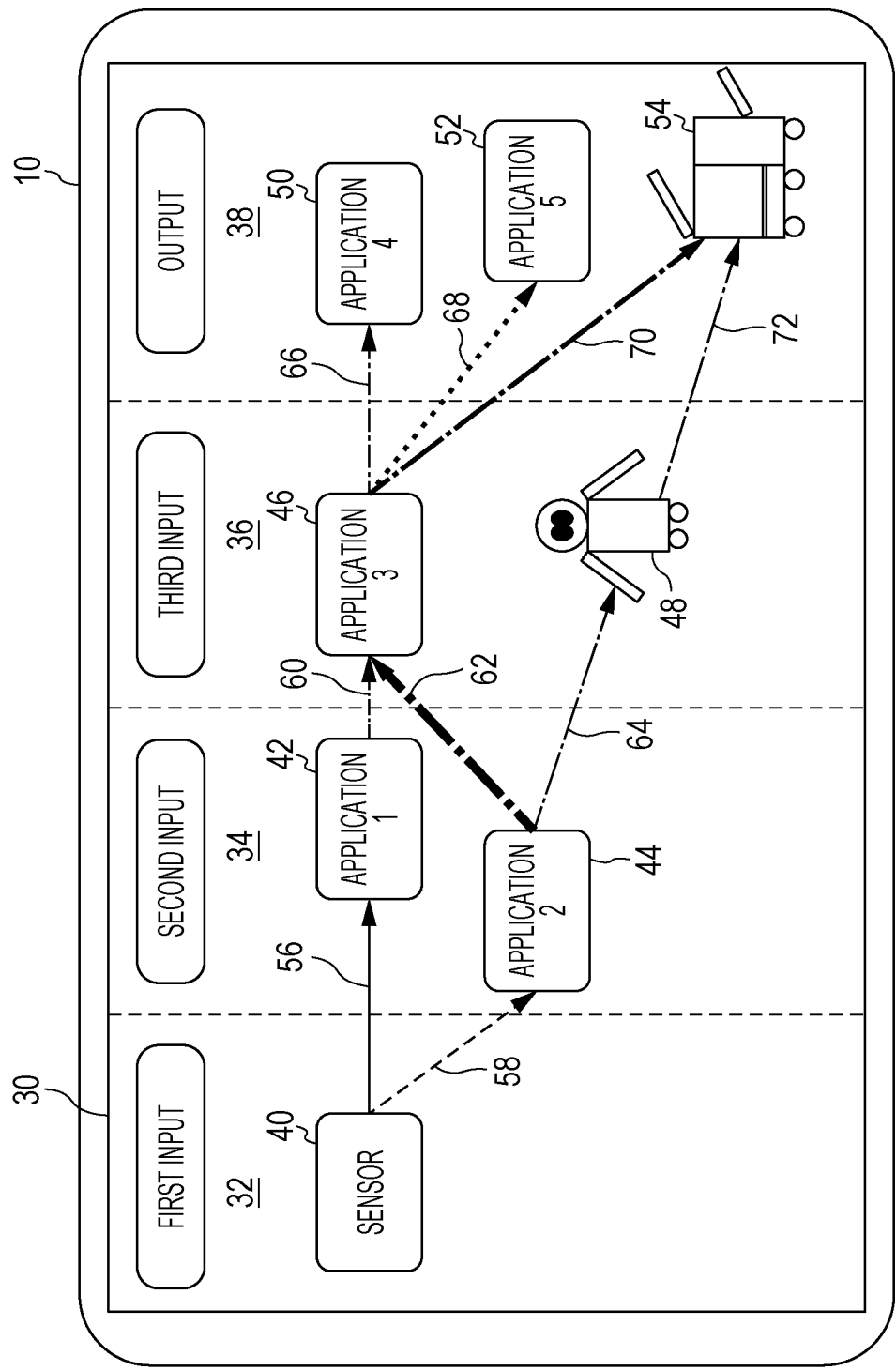

FIG. 5

| ID | CONFIGURATION | ROLE | DETAILS OF PROCESS | CONDITION | CONNECTION RELATIONSHIP |
|---|---|---|---|---|---|
| 1 | SENSOR A | INPUT | INPUT DETECTED DATA | DETECTION | INPUT TO APPLICATION 1<br>INPUT TO APPLICATION 2 |
| 2 | APPLICATION 1 | INPUT | INPUT PROCESS | DETECTED DATA INPUT | INPUT FROM SENSOR A<br>INPUT TO APPLICATION 3 |
| 3 | APPLICATION 2 | INPUT | INPUT PROCESS | DETECTED DATA INPUT | INPUT FROM SENSOR A<br>INPUT TO APPLICATION 3<br>INPUT TO ROBOT C |
| 4 | APPLICATION 3 | INPUT | INPUT PROCESS | ... | INPUT FROM APPLICATION 1, 2<br>INPUT TO APPLICATION 4, 5<br>INPUT TO MULTI-FUNCTION PERIPHERAL B |
| 5 | ROBOT C | INPUT | INPUT PROCESS | ... | INPUT FROM APPLICATION 2<br>INPUT TO MULTI-FUNCTION PERIPHERAL B |
| 6 | APPLICATION 4 | OUTPUT | OUTPUT PROCESS | ... | INPUT FROM APPLICATION 3 |
| 7 | APPLICATION 5 | OUTPUT | OUTPUT PROCESS | ... | INPUT FROM APPLICATION 3 |
| 8 | MULTI-FUNCTION PERIPHERAL B | OUTPUT | OUTPUT PROCESS | ... | INPUT FROM APPLICATION 3<br>INPUT FROM ROBOT C |
| ... | ... | ... | ... | ... | ... |

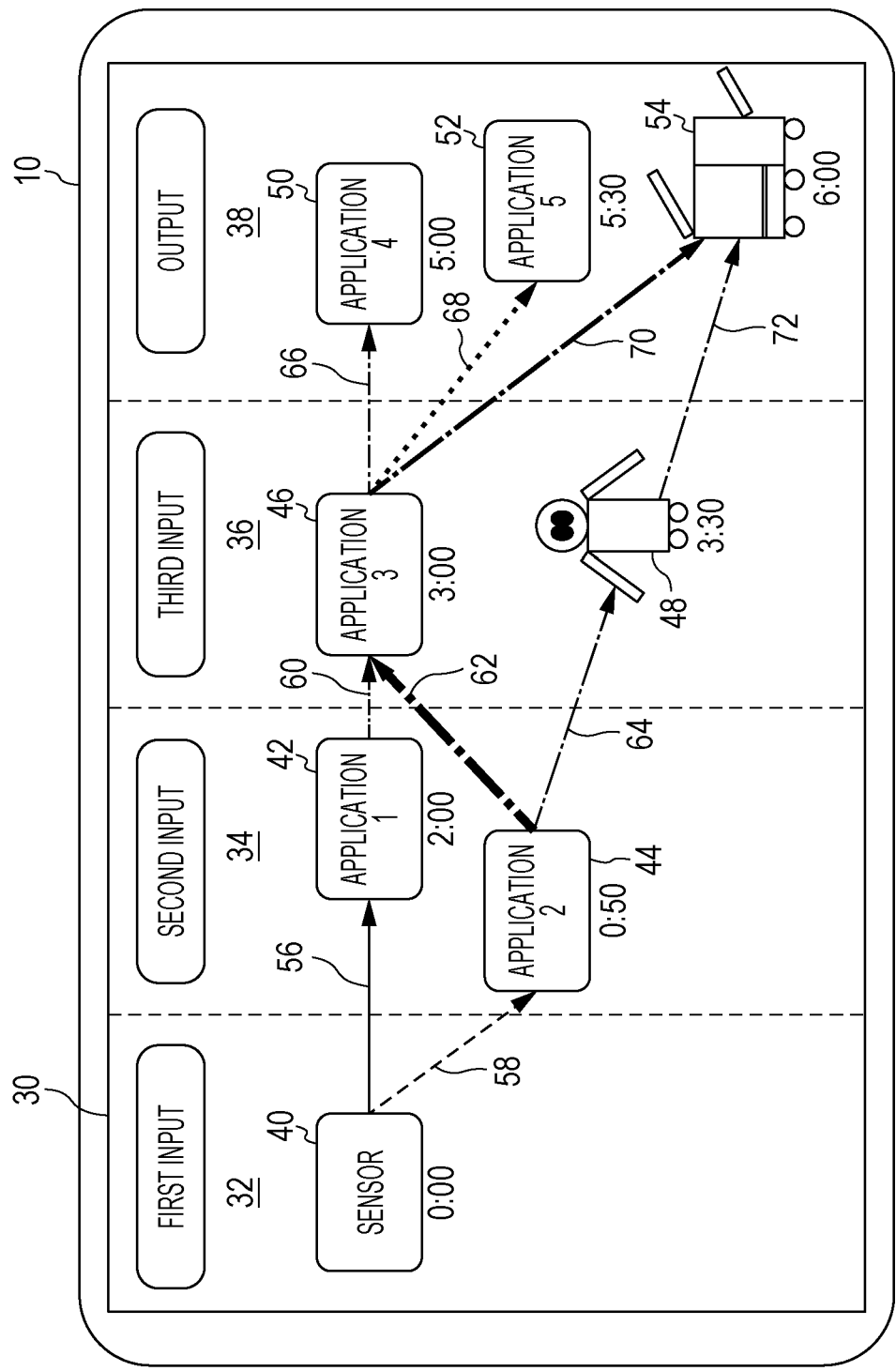

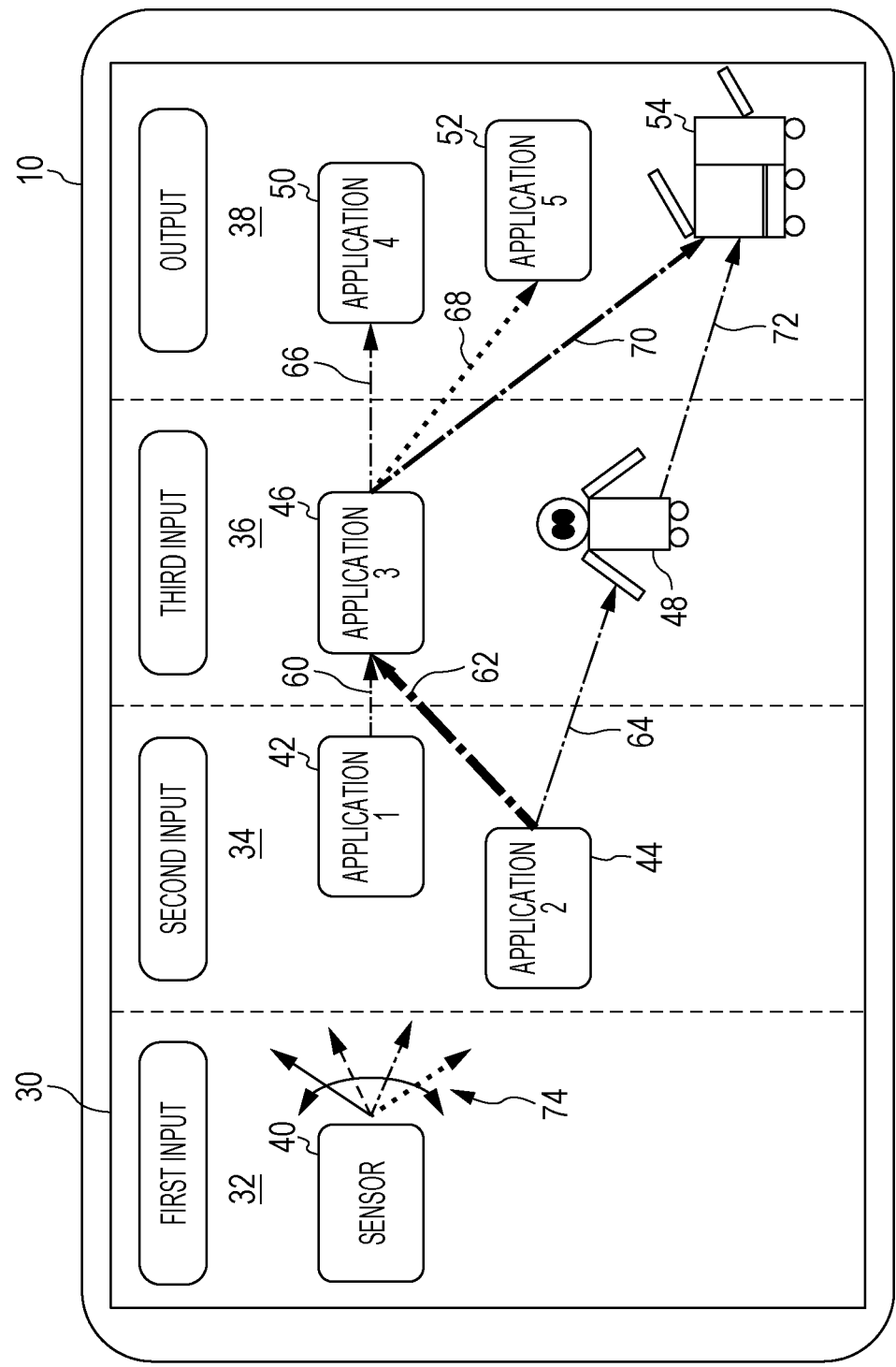

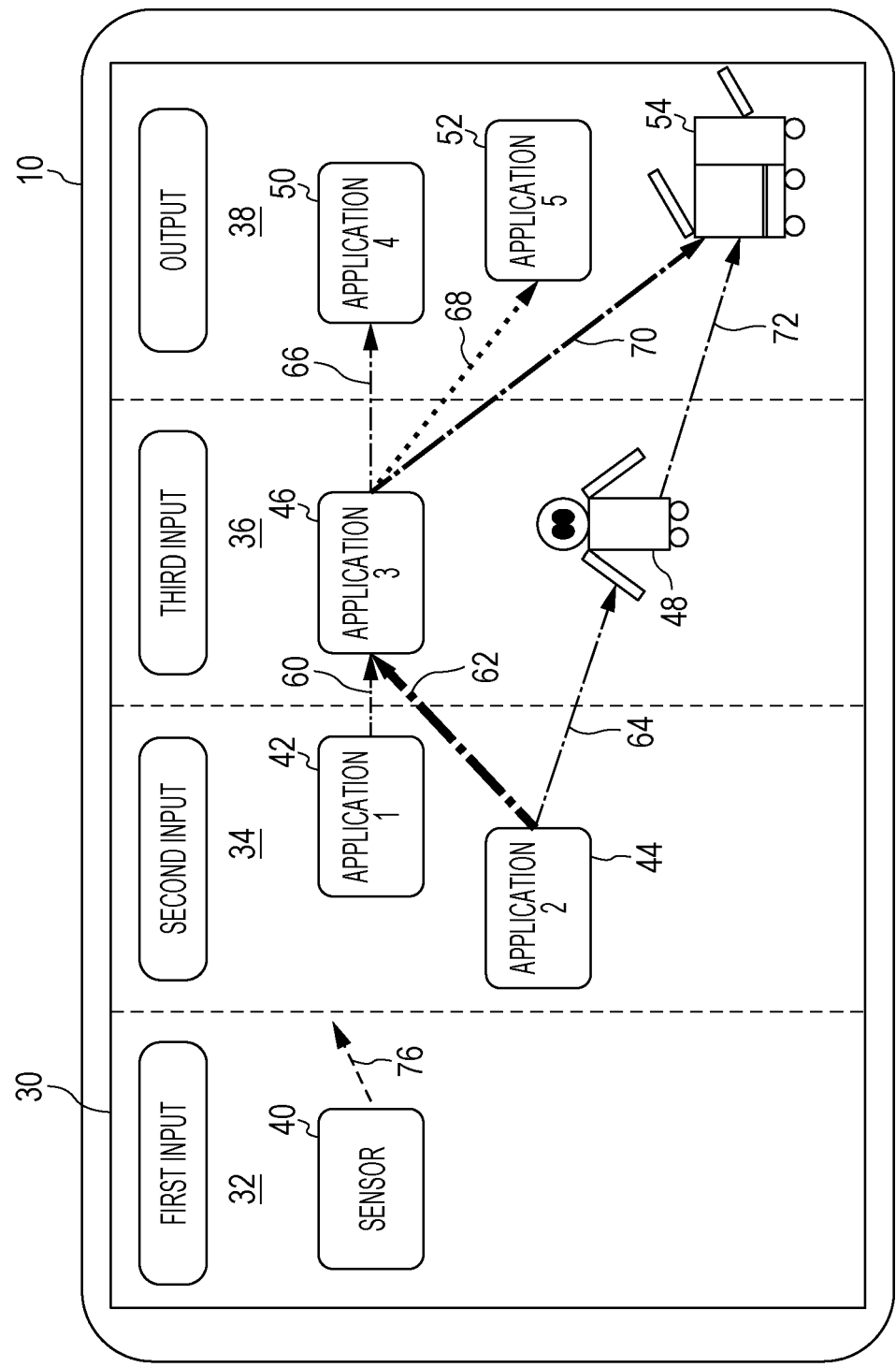

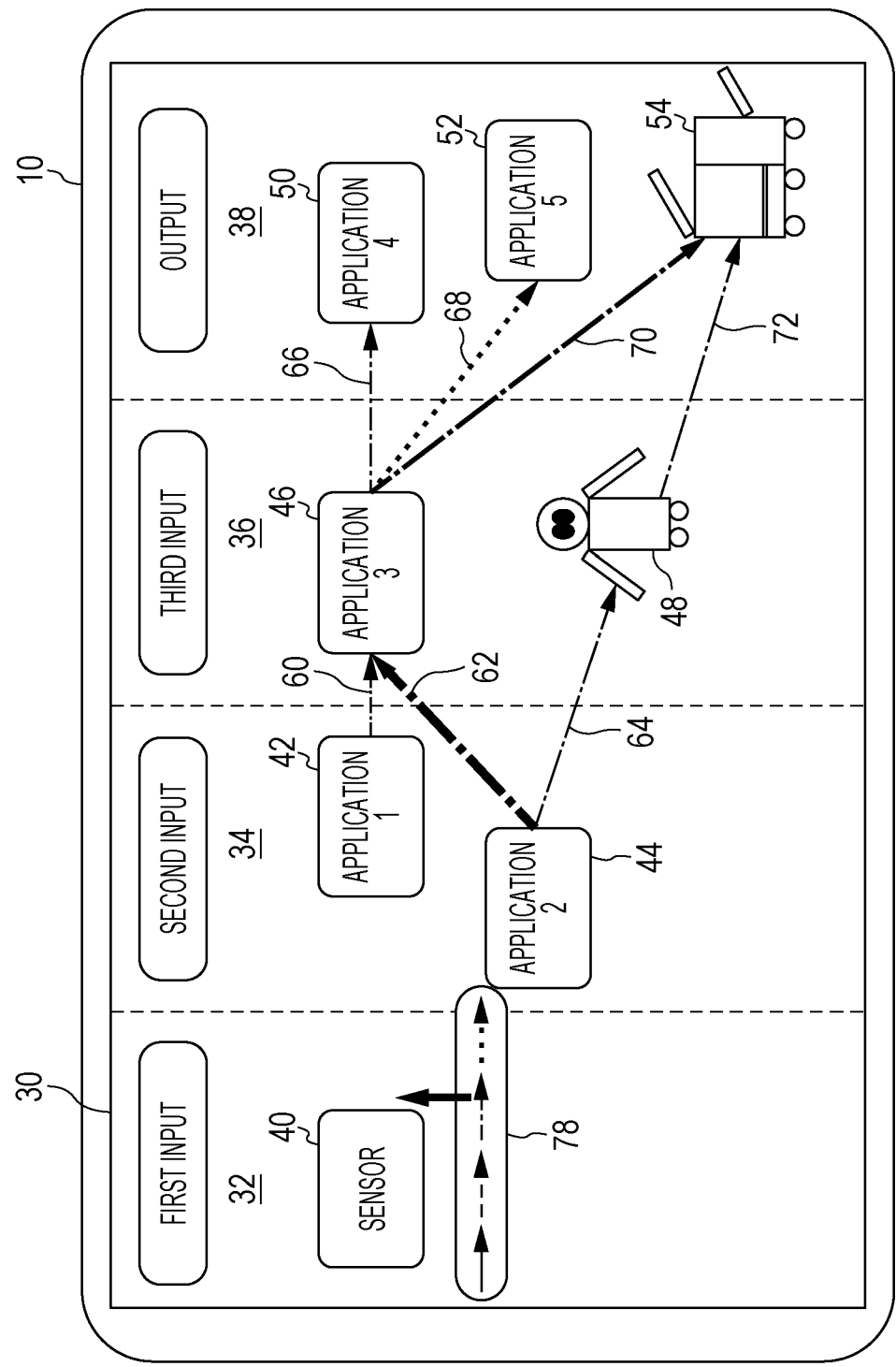

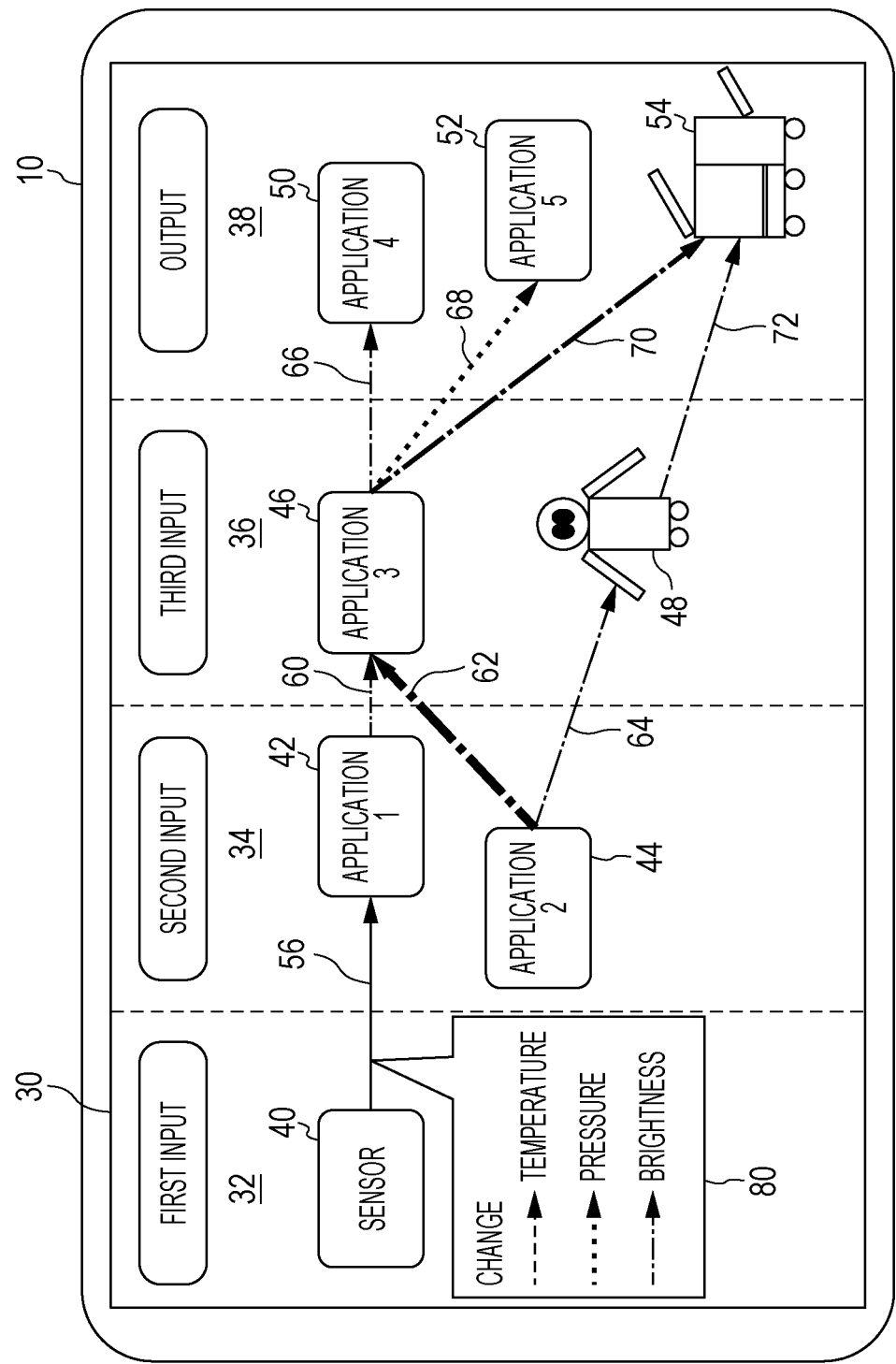

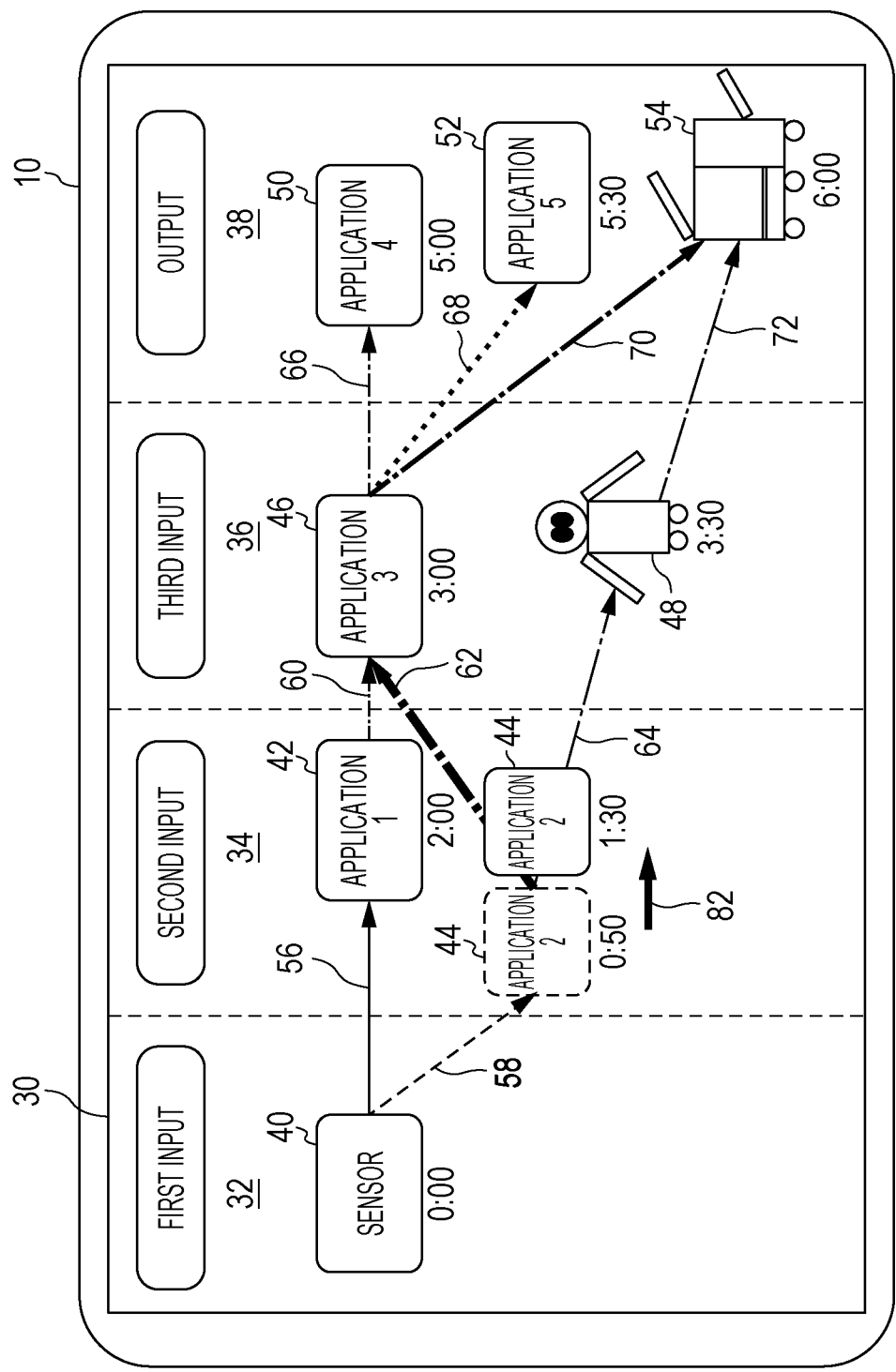

FIG. 19

| ID | CONFIGURATION | DETAILS OF COLLABORATIVE FUNCTION |
|---|---|---|
| 1 | · MULTI-FUNCTION PERIPHERAL B<br>· PRESENTATION APPLICATION P | EXECUTE SCANNING BY USING MULTI-FUNCTION PERIPHERAL B AND ADD SCAN DATA TO PRESENTATION DATA BY USING PRESENTATION APPLICATION P |
| 2 | · MULTI-FUNCTION PERIPHERAL B<br>· ADDRESS MANAGEMENT APPLICATION Q | SEND FAX BY USING MULTI-FUNCTION PERIPHERAL B AND ADD ADDRESS TO WHICH FAX IS SENT TO ADDRESS BOOK BY USING ADDRESS MANAGEMENT APPLICATION Q |
| 3 | · MAIN PART B1 OF MULTI-FUNCTION PERIPHERAL B<br>· PC(D) | EXECUTE SCANNING BY USING MULTI-FUNCTION PERIPHERAL B AND STORE SCAN DATA IN PC(D) |
| 4 | · DOCUMENT CREATION APPLICATION G<br>· FORM CREATION APPLICATION N | ADD DOCUMENT FILE TO FORM FILE |
| 5 | · MULTI-FUNCTION PERIPHERAL B<br>· FORM CREATION APPLICATION N | EXECUTE SCANNING BY USING MULTI-FUNCTION PERIPHERAL B AND ADD SCAN DATA TO FORM BY USING FORM CREATION APPLICATION N |
| 6 | · DOOR OPENING-AND-CLOSING SENSOR E<br>· LIGHTING APPARATUS F | TURN ON LIGHTING APPARATUS F IF OPENING OF DOOR IS DETECTED |
| ... | ... | ... |

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2018-126922 filed Jul. 3, 2018.

BACKGROUND

(i) Technical Field

The present disclosure relates to an information processing apparatus and a non-transitory computer readable medium.

(ii) Related Art

Japanese Unexamined Patent Application Publication No. 2010-187199 discloses that a central processing unit (CPU) receives a job flow setting file in which a job flow is described, and executes the job flow based on the job flow setting file. It is also disclosed that the CPU also notifies other image forming apparatuses of execution of the job flow when the job flow is executed, and notifies the other image forming apparatuses of termination of the job flow when the execution of the job flow is terminated.

Japanese Unexamined Patent Application Publication No. 2011-166748 discloses a job flow including a definition of a plurality of processes to be executed by using a plurality of apparatuses in collaboration. It is also disclosed that the job flow is optimized using priority information indicating the priority of apparatuses that execute each process, and mount information indicating the function mounted by each apparatus.

SUMMARY

In some cases, a collaborative function that is executable by using devices, functions, or the like may be set.

Aspects of non-limiting embodiment of the present disclosure relate to making it possible for a user to set the collaborative function with ease.

Aspects of certain non-limiting embodiments of the present disclosure address the above advantages and/or other advantages not described above. However, aspects of the non-limiting embodiments are not required to address the advantages described above, and aspects of the non-limiting embodiments of present disclosure may not address advantages described above.

According to an aspect of the present disclosure, there is provided an information processing apparatus including a control unit. The control unit changes between a first setting and a second setting of a collaborative function, the second setting being different from the first setting, at least one of a display position of an image and display of connection between images, the image and the images each being associated with a function to be used for the collaborative function.

BRIEF DESCRIPTION OF THE DRAWINGS

An exemplary embodiment of the present disclosure will be described in detail based on the following figures, wherein:

FIG. 3 illustrates an independent function management table;
FIG. 4 illustrates a screen;
FIG. 5 illustrates a configuration management table;
FIG. 6 illustrates a screen;
FIG. 7 illustrates a screen;
FIG. 8 illustrates a screen;
FIG. 9 illustrates a screen;
FIG. 10 illustrates a screen;
FIG. 11 illustrates a screen;
FIG. 19 illustrates a setting details management table.

DETAILED DESCRIPTION

Figure 1:
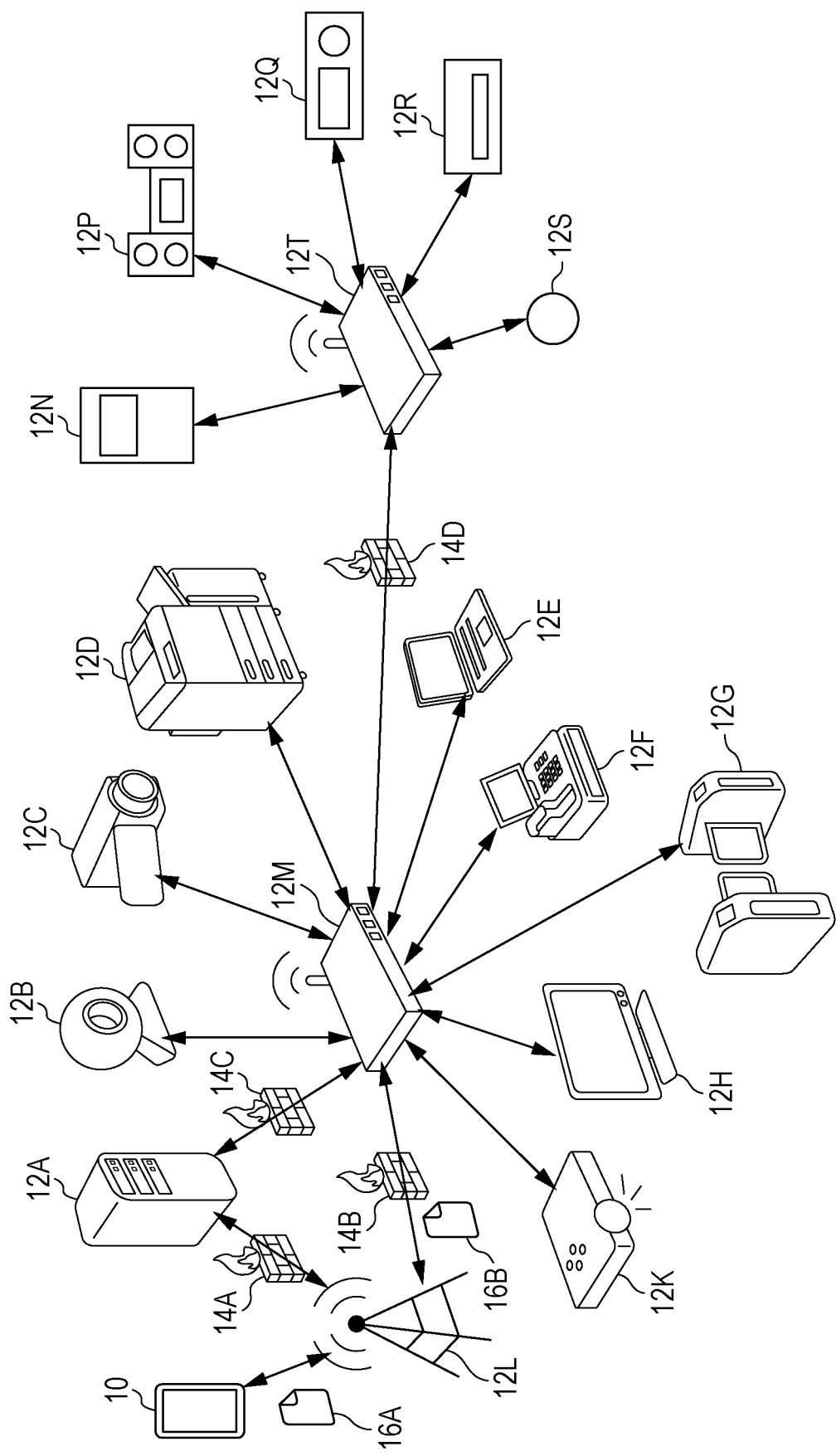
FIG. 1 is a block diagram illustrating a configuration of an information processing system according to the exemplary embodiment.

An information processing system according to an exemplary embodiment of the present disclosure will be described with reference to FIG. 1. FIG. 1 illustrates an example of the information processing system according to exemplary embodiment.

The information processing system according to the exemplary embodiment includes one or more terminal apparatuses and one or more devices. In the example illustrated in FIG. 1, the information processing system includes a terminal apparatus 10 and devices 12A, 12B, 12C, 12D, 12E, 12F, 12G, 12H, 12K, 12L, 12M, 12N, 12P, 12Q, 12R, 12S, and 12T. These configurations are merely examples, and the information processing system may include a plurality of terminal apparatuses 10 and other devices. In the following description, the devices will be referred to as "device 12" or "devices 12" when they do not have to be distinguished from one another. Note that the concept of the device 12 may encompass the terminal apparatus 10. That is, the terminal apparatus 10 may be treated as one of the devices 12.

The terminal apparatus 10 and each of the devices 12 have a function of communicating with another apparatus. The communication may be wireless or wired communication. For example, the terminal apparatus 10 and each of the devices 12 may communicate with another apparatus via a communication path such as the Internet or another network, may communicate directly with another apparatus, may communicate with another apparatus via a relay device that functions as a hub, or may communicate with another apparatus via a so-called cloud or a server. Each of the devices 12 may be a so-called Internet of Things (IoT) device. In addition, a firewall may be provided in the communication path. The firewall prevents unauthorized access into the communication path. In the example illustrated in FIG. 1, firewalls 14A to 14D are provided.

The terminal apparatus 10 as an information processing apparatus is an apparatus such as a personal computer (PC), a tablet PC, a smartphone, or a mobile phone and has a function of communicating with another apparatus. The terminal apparatus 10 may be a wearable terminal (e.g., wristwatch-type terminal, wristband-type terminal, glassestype terminal, ring-type terminal, contact-lens-type terminal, in-body-embedded type terminal, or in-ear wearable terminal). In addition, the terminal apparatus 10 may include a flexible display as a display apparatus. Examples of the flexible display include an organic electroluminescent display (flexible organic EL display), a display in the form of electronic paper, a flexible liquid crystal display, and the like. Any flexible display using another display method may be used. In the flexible display, a display part may be flexibly deformed and may be, for example, bent, folded, wound, twisted, or stretched. The entire terminal apparatus 10 may be formed as the flexible display, or the flexible display and other components may be functionally or physically independent of each other.

Each of the devices 12 is an apparatus having functions and is, for example, an image forming apparatus having an image forming function (e.g., a scan function, a print function, a copy function, or a facsimile function), a PC, a tablet PC, a smart phone, a mobile phone, a robot (a humanoid robot, an animal-shaped robot other than the humanoid robot, or any other type of robot), a projector, a display apparatus such as a liquid crystal display, a recording apparatus, a reproducing apparatus, an image capturing apparatus such as a camera, a refrigerator, a rice cooker, a microwave oven, a coffee maker, a vacuum cleaner, a washing machine, an air conditioner, a lighting apparatus, a timepiece, a security surveillance camera, a motor vehicle, a two-wheeled vehicle, an aircraft (e.g., unmanned aerial vehicle (so-called drone), a game console, any of various sensing devices (e.g., a temperature sensor, a humidity sensor, a voltage sensor, or an electric current sensor), or the like. Each of the devices 12 may provide information to a user (the device 12 may be an image forming apparatus, a PC, or the like, for example) or does not have to provide information to a user (the device 12 may be a sensing device, for example). In addition, all of the plurality of devices 12 that execute a collaborative function, which will be described later, may provide information to a user; some of the devices 12 may provide information to a user while the other devices 12 do not provide information to a user; or none of the devices 12 may provide information to a user. The concept of the device 12 may encompass every type of device. For example, the concept of the device 12 may encompass an information device, a movie device, an audio device, and other devices.

In the exemplary embodiment, as an example, the collaborative function is set by using the terminal apparatus 10. The collaborative function is a function that is executable by using one or more configurations. The configurations are, for example, the devices 12 as hardware, software, functions, or targets. The functions are functions of the devices 12 or the software. The targets are files (data), physical objects, and the like. The terminal apparatus 10 may also be used as a device that executes the collaborative function. The software used for the collaborative function may be installed in the terminal apparatus 10 or may be installed in the devices 12. In a case where a device 12 does not work in collaboration with the other devices 12, the device 12 may independently execute a function in response to reception of an instruction from a user. It is needless to say that a device 12 (e.g., a sensing device) that executes a function without receiving an instruction from a user may also be included in the information processing system.

For example, setting information indicating the collaborative function using a device 12 is stored in the device 12, and the device 12 executes the collaborative function in accordance with the setting information. Note that the setting information may be stored in a relay device, the terminal apparatus 10, or an apparatus such as a server that controls the device 12, and the device 12 may execute the collaborative function under control of the relay device, the terminal apparatus 10, or the apparatus such as the server. In addition, the setting information indicating the collaborative function using software is stored in the terminal apparatus 10, the device 12, or an apparatus such as a server, in which the software is installed, and the software executes the collaborative function in accordance with the setting information.

Now, the collaborative function will be described. The entire device 12, a specific part of the device 12, a specific function of software, a set of functions including a plurality of functions, or the like may be used for the collaborative function. For example, if a function is assigned to each part of the device 12, the collaborative function may be a function that uses the part. A specific example will be described below by referring to a multi-function peripheral having a plurality of functions for image forming. A print function is assigned to a main part of the multi-function peripheral, a scan function is assigned to a scan unit (e.g., a part corresponding to a scanner lid, a scanner glass, or an automatic document feeder) of the multi-function peripheral, and a post-processing function (e.g., a stapling function) is assigned to a post-processing apparatus of the multi-function peripheral. In this case, the main part, the scan unit, or the post-processing apparatus of the multi-function peripheral may be used for the collaborative function. In addition, as software, a set of functions in units of blocks, such as robotics process automation (RPA), may be used for the collaborative function. In addition, if software has a plurality of functions, the collaborative function may be a function that uses some of the plurality of functions. The set of functions includes a plurality of functions, and a process using the set of functions is executed by simultaneously or sequentially executing the plurality of functions. Furthermore, the collaborative function may use only hardware, only software, or both hardware and software. Furthermore, data such as an image file or a document file may be used for the collaborative function.

The collaborative function may be a function that becomes executable by collaboration of a plurality of devices 12 of different types or may be a function that becomes executable by collaboration of a plurality of devices 12 of the same type. The collaborative function may alternatively be a function that has been unusable before collaboration. For example, by collaboration of a device 12 (printer) having a print function and a device 12 (scanner) having a scan function, a copy function becomes executable as the collaborative function. That is, the copy function becomes executable by collaboration of the print function and the scan function. The same applies to software, and the collaborative function may be a function that becomes executable by collaboration of a plurality of pieces of software of different types or may be a function that becomes executable by collaboration of a plurality of pieces of software of the same type.

The concept of the collaborative function may encompass a composite function that enables execution of a new function by causing the plurality of devices 12 to work in collaboration with each other. For example, by combining a plurality of displays, an expansion display function as the composite function may be realized. As another example, by combining a television set and a recorder, a recording function as the composite function may be realized. The recording function is, for example, a function of recording an image displayed on the television set. In addition, by combining a plurality of cameras, an imaging field expanding function as the composite function may be realized. This expanding function is an imaging function by connecting, for example, imaging fields of cameras to each other. In addition, by combining a telephone and a translation machine or translation software, a translated-conversation function (function of translating conversations on the telephone) as the composite function may be realized. In the above manner, the concept of the collaborative function may encompass a function that becomes executable by causing the plurality of devices 12 or a plurality of pieces of software of the same type to work in collaboration with each other, and a function that becomes executable by causing the plurality of devices 12 or a plurality of pieces of software of different types to work in collaboration with each other.

In addition, a connected home (a system in which IoT technology is used to interconnect the devices 12 that are home appliances or the like over a network) may be made by using the plurality of devices 12, and the collaborative function may be used in the connected home. In this case, the devices 12 may be connected to each other via a specific server, or the devices 12 may be connected to each other without a specific server.

Furthermore, the plurality of devices 12 may work in collaboration with each other by using If This Then That (IFTTT) to execute the collaborative function. That is, the collaborative function may be execution of an action (process) of another device 12 if an event as a trigger occurs in a certain device 12. For example, triggered by detection of opening of a door by a sensor that is one of the devices 12, a collaborative function for executing an action of turning on a lighting apparatus that is another one of the devices 12 may be executed. Also, triggered by an action of another certain device 12, a still another device 12 may execute an action. This function may also be encompassed in the concept of the collaborative function. Furthermore, a function of causing a plurality of web services to work in collaboration and Application Programming Interface (API) collaboration for causing a plurality of systems, services, and the like to work in collaboration by utilizing an API may also be encompassed in the concept of the collaborative function.

In addition, a role may be associated with a configuration used for the collaborative function. Examples of the role include an input process and an output process. In the following description, a configuration with which the input process as the role is associated will be referred to as "input configuration", and a configuration with which the output process as the role is associated will be referred to as "output configuration". An example of the collaborative function is executed by causing the input configuration and the output configuration to work in collaboration with each other.

The input configuration is a configuration for inputting (transmitting) data to another configuration (e.g., a device 12 or software). Note that the transmission has the same meaning as input in the following description. The other configuration may be another input configuration or the output configuration. The concept of the input process encompasses a process for only inputting data, a process including pre-processing of data and input of data, and the like. That is, the input configuration may execute pre-processing and may input the result of the pre-processing to another configuration or may input data to another configuration without executing the pre-processing. The concept of the pre-processing encompasses, for example, a data generating process, a data collecting process, a data collating process, and the like. The concept of the data generating process encompasses a process for extracting data from data (extracting process), a process for processing data (processing process), a process for generating new data by combining a plurality of data items (combining process), a process for generating new data by synthesizing a plurality of data items (synthesizing process), and the like. One or more data items that have been input from one or more configurations may be subjected to the above generating process, or one or more data items that have been generated by one or more configurations may be subjected to the above generating process. For example, if the input process including the combining process is associated with a plurality of configurations, a plurality of data items from the plurality of configurations may be combined. The concept of the data collecting process encompasses measurement, detection, and the like of data. The data collating process is, for example, a process for collating a plurality of data items that have been input from one or more configurations or a plurality of data items that have been generated by one or more configurations. For example, if the input process including the collating process is associated with a plurality of configurations, a plurality of data items from the plurality of configurations may be collated. The input configuration may apply the input process to data that has been input thereto from another input configuration or may execute the input process in response to input of data thereto from the other input configuration, without using the data. The input configuration may input the data that has been input thereto from another input configuration to still another configuration as the input process. As another example, the input configuration may execute a process that is associated with the input configuration as the input process and may input the data that is generated through the process to another configuration. As still another example, the input configuration may collect data and may input the collected data to another configuration as the input process.

The output configuration is a configuration for executing the output process. The output process may be a process including the above pre-processing (e.g., a data generating process, a data collecting process, or a data collating process). The output configuration may execute the output process by using data that has been input (transmitted) from the input configuration to the output configuration. As another example, the output configuration may execute the output process in response to input of data from the input configuration to the output configuration, without using the data. The output configuration may execute the output process by using data other than the data that has been input to the output configuration. The output process corresponds to a final process included in the collaborative function.

In the example illustrated in FIG. 1, the device 12A is a server, the device 12B is a security surveillance camera, the device 12C is a video camera, the device 12D is a multi-function peripheral having an image forming function, the device 12E is a laptop PC, the device 12F is a cash register, the device 12G is an entrance/exit gate, the device 12H is a TV monitor, the device 12K is a projector, the device 12L is a communication base station, and the device 12M is a relay device (e.g., a router). The devices 2A and 12M and the terminal apparatus 10 are connected to the device 12L. The devices 12A to 12K are connected to the device 12M. The firewall 14A is provided in a communication path between the device 12A and the device 12L. The firewall 14B is provided in a communication path between the device 12L and the device 12M. The firewall 14C is provided in a communication path between the device 12A and the device 12M.

The device 12N is an air cleaner, the device 12P is an audio device, the device 12Q is a recorder, the device 12R is an air conditioner, the device 12S is a sensor, and the device 12T is a relay device (e.g., a router). The devices 12N to 12S are connected to the device 12T. The device 12T is connected to the device 12M. The firewall 14D is provided in a communication path between the device 12T and the device 12M.

For example, data 16A and data 16B (e.g., instruction information, file, and the like) are transmitted and received between the terminal apparatus 10 and the devices 12.

The relay device may control the other devices 12 (e.g., hardware of the other devices 12 and software installed in the other devices 12) that are connected to the relay device, for example. In addition, the relay device may acquire various pieces of information by using the Internet or the like. The relay device may serve as a server or may manage data and user information, for example. The relay device may be a so-called smart speaker (a device having a communication function and a speaker function) or may be a device that has a communication function but does not have a speaker function. The relay device may be installed indoors (e.g., on the floor, the ceiling, or a table in a room) or outdoors. In addition, the relay device may be a movable device (e.g., a self-running device).

Each of the devices 12 is configured to execute an independent function. The independent function is executed in accordance with an instruction from a user or is automatically executed regardless of an instruction from a user. In addition, each of the devices 12 may execute the collaborative function that is set in the device 12. For example, setting information indicating details of the collaborative function is stored in each of the devices 12 to be used for the collaborative function, and each of the devices 12 executes the collaborative function indicated by the setting information stored in the device 12 in collaboration with another device 12.

As described above, there are one or more terminal apparatuses 10 and one or more devices 12 in a real space. In addition, one or more pieces of software are installed in each of the one or more terminal apparatuses 10 and each of the one or more devices 12. The information processing stem according to the exemplary embodiment may obviously include a terminal apparatus 10 or a device 12 in which software is not installed. The software is present in a virtual space (e.g., a virtual space formed storage region in which the software is stored).

Figure 2:
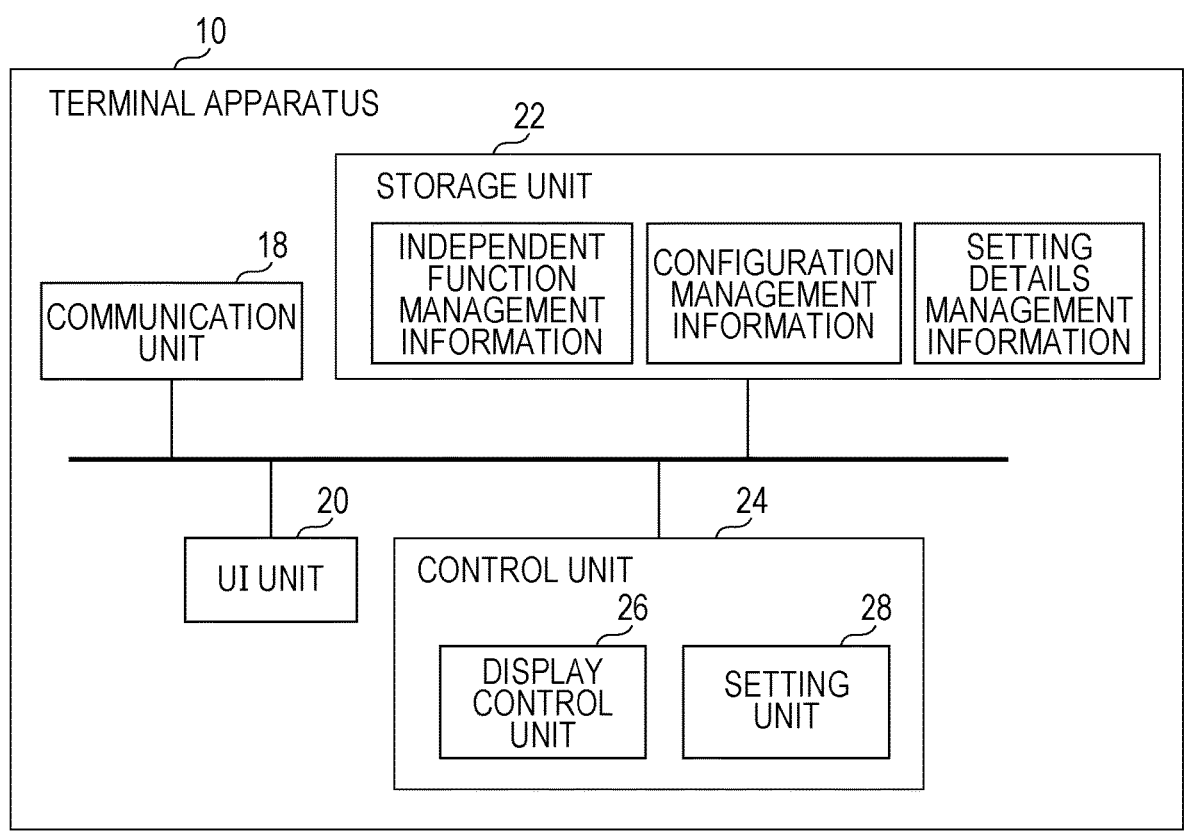
FIG. 2 is a block diagram illustrating a configuration of a terminal apparatus.

Now, a configuration of the terminal apparatus 10 will de described in detail with reference to FIG. 2. FIG. 2 illustrates the configuration of the terminal apparatus 10.

A communication unit 18 is a communication interface and has a function of transmitting data to other apparatuses and a function of receiving data from other apparatuses. The communication unit 18 may be a communication interface having a wireless communication function or may be a communication interface having a wired communication function. The communication unit 18 is compliant with, for example, one or more types of communication schemes, and may communicate with a communication partner in accordance with a communication scheme that is suitable for the communication partner (i.e., a communication scheme supported by the communication partner). Examples of the communication scheme include infrared communication, visible light communication, Wi-Fi (registered trademark) communication, short-range wireless communication (e.g., near field communication (NFC)), and the like. For short-range wireless communication, Felica (registered trademark), Bluetooth (registered trademark), a radio frequency identifier (RFID), or the like is used. In addition, the communication unit 18 may be compliant with a fifth-generation mobile communication system (5G). It is needless to say that wireless communication of another scheme may also be used for short-range wireless communication. The communication unit 18 may switch the communication scheme or a frequency band in accordance with the communication partner or may switch the communication scheme or a frequency band in accordance with the ambient environment. Examples of the frequency band include 2.4 GHz and 5 GHz.

A user interface (UI) unit 20 is a user interface and includes a display unit and an operation unit. The display unit is a display apparatus such as liquid crystal display. The display unit may be a flexible display. The operation unit is an input apparatus such as a touch panel or a keyboard. The UI unit 20 may be a user interface that serves as the display unit and the operation unit (e.g., a touch display or an apparatus that displays an electronic keyboard or the like on a display). In addition, the UI unit 20 may further include a sound collecting unit such as a microphone and an audio generating unit such as a speaker. In this case, information may be input to the terminal apparatus 10 by audio, and information may be output by audio.

A storage unit 22 is a storage apparatus such as a hard disk or a memory (e.g., a solid state drive (SSD)). The storage unit 22 stores, for example, various data items, various programs (pieces of software), and the like. Examples of the programs include an operating system (OS) and various application programs (pieces of software). The storage unit 22 further stores device address information indicating the addresses of the devices 12 (e.g., Internet Protocol (IP) addresses or Media Access Control (MAC) addresses allocated to the devices 12) and the like.

The storage unit 22 further stores independent function management information, configuration management information, and setting details management information.

The independent function management information is information used for managing the functions of the devices 12 and pieces of software as configurations and output details of data or the like output from the devices 12 and pieces of software. The independent function management information is, for example, created in advance and stored in the storage unit 22.

The configuration management information is information used for managing the configurations with which roles are associated. For example, the configuration management information, the following pieces of information are associated with each other for each configuration: configuration identification information for identifying the configuration, role information indicating a role that is associated with the configuration, information indicating a process to be executed by the configuration in accordance with the role, information indicating a condition for executing the process, and connection information indicating a connection relationship between the configuration and another configuration. The information indicating a process includes information indicating details of data to be input (transmitted) to another configuration. The connection information is information indicating another configuration that is connected to the configuration. As will be described later, an input process or an output process is associated with the configuration by a setting unit 28, and information indicating the association is registered in the configuration management information.

The setting details management information is information used for managing collaborative functions that have been set. For example, in the setting details management information, for each collaborative function, a combination of pieces of configuration identification information and function information are associated with each other. The pieces of configuration identification information are pieces of information for identifying configurations to be used for the collaborative function, and the function information is information regarding the collaborative function.

Examples of the configuration identification information include a name of a configuration, a symbol, an image associated with the configuration, and the like. Examples of the function information include identification information such as a name or an ID of a collaborative function and details information indicating details of the collaborative function. Hereinafter, an image associated with a configuration will be referred to as "configuration image".

If a configuration is a device 12, the configuration identification information is information for identifying the device 12 (device identification information). If a configuration is software, the configuration identification information is information for identifying the software (software identification information). If a configuration is a target, the configuration identification information is information for identifying the target (target identification information). The configuration identification information for identifying the device 12 may include information indicating a function of the device 12. Similarly, the configuration identification information for identifying the software may include information indicating a function of the software.

Examples of the device identification information include a name of the device 12, a device ID, information indicating a type of the device 12, a model number of the device 12, information for managing the device 12 (e.g., property management information), information indicating a location where the device 12 is installed (device location information), an image associated with the device 12 (device image), device address information, and the like. The device image is, for example, an external appearance image of the device 12. The external appearance image may be an image representing an exterior of the device 12 (e.g., a housing of the device), an image representing a state in which the housing is open and an interior may be seen from outside (e.g., an internal structure), or an image representing a state in which the device 12 is covered with a wrapping sheet or the like. The device image may be an image generated by imaging the device 12 by using an imaging apparatus such as a camera (e.g., an image representing the exterior or interior of the device 12), or may be an image schematically representing the device 12 (e.g., an icon). The device image may be a still image or a moving image. The data of the device image may be stored in the storage unit 22 or may be stored in another apparatus the (e.g., the device 12 or a server).

Examples of the software identification information include a name of the software, a software ID, information indicating a type of the software, a model number of the software, information for managing the software, an image associated with the software (software image), and the like. The software image is, for example, an image representing the software (e.g., an icon). The software image may be a still image or a moving i image. The data of the software image may be stored in the storage unit 22 or may be stored in another apparatus (e.g., the device 12 or a server).

Examples of the target identification information include a name of the target, a target ID, information indicating a type the target, an image associated with the target (target image), and the like. In a case where the target is a file (data), a name of the file (e.g., an image file or a document file) or the like is used as the target identification information. In a case where the target is a physical object (e.g., a product), a name of the object or the like is used as the target identification information. The target image may be an image (e.g., a still image or a moving image) generated by imaging a physical object by using an imaging apparatus such as a camera, or an image that schematically represents the target (e.g., an icon). The data of the target image may be stored in the storage unit 22 or may be stored in another apparatus (e.g., the device 12 or a server).

Note that the independent function management information, the configuration management information, and the setting details management information may be stored in the device 12, a server, or the like. In this case, these pieces of information do not have to be stored in the terminal apparatus 10. In the following description, it is assumed that these pieces of information are stored in the terminal apparatus 10.

A control unit 24 is configured to control an operation of each unit of the terminal apparatus 10. For example, the control unit 24 executes various programs (pieces of software), controls communication of the communication unit 18, controls notification of information (e.g., display of information or audio output) by using the UI unit 20, receives information that has been input to the terminal apparatus 10 by using the UI unit 20, writes information into the storage unit 22, and reads information from the storage unit 22. In addition, the control unit 24 includes a display control unit 26 and the setting unit 28.

The display control unit 26 is configured to cause the display unit of the UI unit 20 to display various pieces of information. For example, the display control unit 26 causes the display unit to display a configuration image that is associated with a configuration (e.g., a device 12, a function, software, or a target) to be used for a collaborative function, and changes at least one of the following between a first setting and a second setting of the collaborative function, the second setting being different from the first setting: a display position of a configuration image and display of connection between configuration images, the configuration image and the configuration images each being associated with a configuration to be used for the collaborative function. The display of connection is, for example, an image representing a line connecting the configuration images to each other or information (e.g., a character string or a symbol) displayed between the configuration image. In addition, the display control unit 26 may further set (form), on a screen of the display unit, a display region with which an input process or an output process as a role is associated, and may cause a configuration image to be displayed in the display region.

The setting unit 28 is configured to set the collaborative function for a configuration (e.g., a device 12, a function, software, or a target). The setting unit 28 also registers information indicating setting details of the collaborative function in the setting details management information. In addition, the setting unit 28 is configured to change the setting of the collaborative function in response to a change of at least one of the display position of the configuration image and the display of connection between the configuration images, the configuration image and the configuration images each being associated with a configuration to be used for the collaborative function.

The setting unit 28 may set the collaborative function that is executable by using a plurality of configurations by associating an input process or an output process as a role with a configuration image. For example, if a configuration image is displayed in a display region with which a role is associated, the setting unit 28 associates the role with a configuration that is associated with the configuration image. If a configuration image is displayed in a display region with which an input process is associated, the setting unit 28 associates the input process with a configuration that is associated with the configuration image, and registers the configuration as the input configuration in the configuration management information. Thus, the configuration is used as the input configuration. If a configuration image is displayed in a display region with which an output process is associated, the setting unit 28 associates the output process with a configuration that is associated with the configuration image, and registers the configuration as the output configuration in the configuration management information. Thus, the configuration is used as the output configuration. In addition, the setting unit 28 registers the connection information between configurations in the configuration management information. The setting unit 28 sets the collaborative function that is executable by using the input configuration and the output configuration, and registers a combination of the input configuration, the output configuration, and the collaborative function in the setting details management information. If a role that associated with a configuration image is changed, the setting unit 28 changes the collaborative function. That is, in accordance with the role that is associated with the configuration image, the setting unit 28 changes the collaborative function that is set by using the configuration image.

Note that the setting unit 28 may be provided in a device 12, and the device 12 may execute the processes performed by the setting unit 28. In this case, the setting unit 28 does not have to be provided in the terminal apparatus 10. In the following description, it is assumed that the setting unit 28 is provided in the terminal apparatus 10.

Now, the independent function management information will be described in detail with reference to FIG. 3. FIG. 3 illustrates an example of an independent function management table as the independent function management information.

In the independent function management table illustrated in FIG. 3, as an example, configuration identification information for identifying a device 12 or software, independent function information indicating an independent function of the device 12 or software, and information indicating details (e.g., data or object) output from the device 12 or software correspond with one another. The independent function management table is created in advance and stored in the storage unit 22.

The devices 12 registered in the independent function management table are the devices 12 included in the information processing system. If a new device 12 is added to the information processing system, an independent function and output details of the device 12 may be registered in the independent function management table. In addition, the software registered in the independent function management table is software installed in the terminal apparatus 10 or the devices 12. If new software is installed in the terminal apparatus 10 or the devices 12, an independent function and output details of the software may be registered in the independent function management table. For example, the independent function management table is updated by transmitting and receiving information between the terminal apparatus 10 and the devices 12. The information registered in the independent function management table may be shared between the terminal apparatus 10 and the devices 12.

Now, details registered in the independent function management table will be described in detail.

A sensor A as one of the devices 12, for example, has a detection function including a temperature detection function, a humidity detection function, and a pressure detection function, and outputs detection results (e.g., data such as temperature data, humidity data, and pressure data) as output details.

A multi-function peripheral B as one of the devices 12, for example, has an image forming function including a scan function, a print function, and a copy function, and outputs image data, printed materials, and the like as output details.

A robot C as one of the devices 12, for example, has a convey function, an imaging function, a conversation function, a search function, and the like, and outputs image data, audio data, and the like as output details.

An application 1 as a piece of software, for example, has a statistics collecting function, and outputs statistics data and the like as output details.

An application 2 as a piece of software, for example, has a document creating function, and outputs document data and the like as output details.

An application 3 as a piece of software, for example, has an image processing function, and outputs image data and the like as output details.

The above devices 12 and pieces of software are merely examples, and other devices 12 and pieces of software may be registered in the independent function management table. In addition, independent functions that are assigned to parts of devices 12 may be registered in the independent function management table. For example, if a print function is assigned to a main part B1 of the multi-function peripheral B, information indicating the main part B1 and information indicating a print function correspond with each other and are registered in the independent function management table. Software that is associated with a file (data) as a target may also be registered in the independent function management table.

By referring to the independent function management table, the independent functions and output details of each of the devices 12 and pieces of software are identified.

Now, a process for setting collaborative functions will be described with reference to FIG. 4.

FIG. 4 illustrates an example of a screen for setting collaborative functions. For example, in response to starting of software for setting a collaborative function, or in response to access of the terminal apparatus 10 into a web site for setting a collaborative function, the display control unit 26 causes the display unit of the UI unit 20 to display a screen 30 for setting collaborative functions. Note that the software may be installed in the terminal apparatus 10 or may be installed in an apparatus other than the terminal apparatus 10.

The display control unit 26 sets (forms) display regions on the screen 30. Note that a role is associated with each of the display regions. Specifically, the display control unit 26 sets one or more input display regions and one or more output display regions on the screen 30. Note that an input process as a role is associated with each of the one or more input display regions, and an output process as a role is associated with each of the one or more output display regions.

In the example illustrated in FIG. 4, as the input display regions, a first input display region 32, a second input display region 34, and a third input display region 36 are arranged in this order. In addition, an output display region 38 is arranged next to the third input display region 36 (on the opposite side of the second input display region 34).

Note that only a single input display region may be set, four or more input display regions may be set, and a plurality of output display regions may be set. In addition, a user may specify the number of the input display regions and the number of the output display regions. In this case, the display control unit 26 sets, on the screen 30, as many input display regions and output display regions as the numbers specified by the user.

In a case where a configuration image is displayed in the first input display region 32, the second input display region 34, or the third input display region 36, the setting unit 28 associates an input process as a role and an input condition for executing the input process, with a configuration that is associated with the configuration image. Further, the setting unit 28 registers the configuration as the input configuration in the configuration management information. Specifically, in a case where a configuration image is displayed in the first input display region 32, the setting unit 28 associates a first input process and a first input condition with a configuration that is associated with the configuration image. Further, the setting unit 28 registers the configuration as a first input configuration in the configuration management information. Similarly, in a case where a configuration image is displayed in the second input display region 34, the setting unit 28 associates a second input process and a second input condition with a configuration that is associated with the configuration image. Further, the setting unit 28 registers the configuration as a second input configuration in the configuration management information. Similarly, in a case where a configuration image is displayed in the third input display region 36, the setting unit 28 associates a third input process and a third input condition with a configuration that is associated with the configuration image. Further, the setting unit 28 registers the configuration as a third input configuration in the configuration management information. Specific details of each of the input processes are specified by a user.

For example, in a case where the user specifies any of configuration images that are associated with the input configurations on the screen 30, the display control unit 26 identifies one or more functions of a configuration that is associated with the configuration image in the independent function management table, and causes information indicating the one or more functions (function list) to be displayed on the screen 30. The user specifies a function to be executed by the configuration (function to be used for a collaborative function) as an input process from the function list. The user also specifies an input condition for executing the input process. For example, candidates for the input condition are associated with each configuration, and information indicating the association is registered in advance in the independent function management table. The display control unit 26 causes a list of candidates for the input condition to be displayed on the screen 30, the input condition being associated with the configuration specified by the user. The user specifies an input condition from the list of candidates. The setting unit 28 sets the above function (input process) for the configuration as the function to be used for a collaborative function, sets the input condition for the configuration, and registers these setting details in the setting details management information.

In a case where a configuration image is displayed in the output display region 38, the setting unit 28 associates an output process as a role and an output condition for executing the output process with a configuration that is associated with the configuration image. Further, the setting unit 28 registers the configuration as the output configuration in the configuration management information. Specific details of the output process are specified by a user.

For example, in a case where the user specifies a configuration image that is associated with the output configuration on the screen 30, the display control unit 26 identifies one or more functions of a configuration that is associated with the configuration image in the independent function management table, and causes information indicating the one or more functions (function list) to be displayed on the screen 30. The user specifies a function to be executed by the configuration (function to be used for a collaborative function) as an output process from the function list. The user also specifies an output condition for executing the output process. For example, candidates for the output condition are associated with each configuration, and information indicating the association is registered in advance in the independent function management table. The display control unit 26 causes a list of candidates for the output condition to be displayed on the screen 30, the output condition being associated with the configuration specified by the user. The user specifies an output condition from the list of candidates. The setting unit 28 sets the above function (output process) for the configuration as a function to be used for a collaborative function, sets the output condition for the configuration, and registers these setting details in the setting details management information.

The configurations are connected to each other by a user operation. That is, a user specifies a data input destination (transmission destination). For example, in a case where the user performs an operation for connecting configuration images to each other, the data input destination is specified. Specifically, in a case where the user performs an operation for joining a configuration image that is associated with the first input configuration and a configuration image that is associated with the second input configuration to each other, the setting unit 28 connects the first input configuration and the second input configuration to each other. In addition, the setting unit 28 registers the connection information indicating the connection relationship in the configuration management information in association with each of the first input configuration and the second input configuration. The connection information associated with the first input configuration includes the configuration identification information indicating the second input configuration as a connection partner. The connection information associated with the second input configuration includes the configuration identification information indicating the first input configuration as a connection partner. The same applies to the other configurations. By referring to the connection information, the connection relationship between the configurations is identified.

At the time of execution of a collaborative function, once the first input condition associated with the first input configuration is satisfied, the first input configuration executes the first input process so as to input (transmit) data to the second input configuration and the following configurations. For example, in a case where the second input configuration is connected to the first input configuration, the first input configuration inputs data to the second input configuration. Once the second input condition associated with the second input configuration is satisfied, the second input configuration executes the second input process so as to input (transmit) data to the third input configuration and the following configuration. For example, in a case where the third input configuration is connected to the second input configuration, the second input configuration inputs data to the third input configuration. Once the third input condition associated with the third input configuration is satisfied, the third input configuration executes the third input process so as to input (transmit) data to the output configuration that is connected to the third input configuration. Once the output condition associated with the output configuration is satisfied, the output configuration executes the output process. The data to be input (transmitted) is data generated through a process, data used for a process, data that is collected, or the like.

In the above manner, at the time of execution of a collaborative function, data is transmitted from the first input configuration to the output configuration. In addition, in a case where a plurality of input configurations including the second input configuration and the following configuration are connected to the first input configuration, data is input (transmitted) to the plurality of input configurations from the first input configuration. The same applies to the input configurations other than the first input configuration.

In addition, since the configurations are connected to each other by the user, the configurations are specified as configurations that execute a collaborative function together, and the setting unit 28 registers the configurations as configurations to be used for the collaborative function in the setting details management information.

Now, specific examples will be described. In the first input display region 32, a device image 40 is displayed as an example of the configuration image by a user operation. The device image 40 is an image associated with the sensor A as one of the devices 12. The setting unit 28 associates the first input process and the first input condition with the sensor A and registers the sensor A as the first input configuration in the configuration management information. Thus, the sensor A is used as the first input configuration. The first input process and the first input conditions that are associated with the sensor A are, as described above, specified by the user. For example, by referring to the independent function management table, the display control unit 26 identifies one or more functions of the sensor A and causes information indicating the one or more functions (function list) to be displayed on the screen 30. The user specifies a function to be executed by the sensor A as the first input process from the function list. In addition, the display control unit 26 also causes a list of candidates for the input condition to be displayed on the screen 30, the input condition being associated with the sensor A. The user specifies the first input condition from the list of candidates. The setting unit 28 associates the first input process and the first input condition with the sensor A, the first input process and the first input condition having been specified by the user in the above manner. The same applies to the other configurations described below.

In the second input display region 34, software images 42 and 44 are displayed each as an example of the configuration image by a user operation. The software image 42 is an image associated with the application 1 as a piece of software, and the software image 44 is an image associated with the application 2 as a piece of software. The setting unit 28 associates the second input process and the second input condition with the application 1 and registers the application 1 as the second input configuration in the configuration management information. Similarly, the setting unit 28 associates the second input process and the second input condition with the application 2 and registers the application 2 as the second input configuration in the configuration management information. Thus, the applications 1 and 2 are each used as the second input configuration.

In the third input display region 36, a software image 46 and a device image 48 are displayed each as an example of the configuration image by a user operation. The software image 46 is an image associated with the application 3 as a piece of software, and the device image 48 is an image that is associated with the robot C as one of the devices 12. The setting unit 28 associates the third input process and the third input condition with the application 3 and registers the application 3 as the third input configuration in the configuration management information. Similarly, the setting unit 28 associates the third input process and the third input condition with the robot C and registers the robot C as the third input configuration in the configuration management information. Thus, the application 3 and the robot C are each used as the third input configuration.

In the output display region 38, software images 50 and 52 and a device image 54 are displayed each as an example of the configuration image by a user operation. The software image 50 is an image associated with a application 4 as a piece of software, the software image 52 is an image associated application 5 as a piece of software, and the device image 54 is an image associated with the multi-function peripheral B as one of the devices 12. The setting unit 28 associates the output process with each of the applications 4 and 5 and the multi-function peripheral B and registers the applications 4 and 5 and the multi-function peripheral B each as the output configuration in the configuration management information. Thus, the applications 4 and 5 and the multi-function peripheral B are each used as the output configuration.

Each of the software images and each of the device images illustrated above are arranged in a corresponding display region by a user operation. Also, as described above, the input process and the output process to be executed by each of the configurations are specified by the user.

By an operation for joining configuration images to each other, the configurations are connected to each other, and the data input destination (transmission destination) is specified. In the example illustrated in FIG. 4, the configuration images are connected to each other via arrows.

For example, in a case where a user performs an operation for joining the device image 40 and the software image 42 to each other by operating the UI unit 20, the display control unit 26 causes an arrow image 56 to be displayed on the screen 30. The arrow image 56 connects the device image 40 and the software image 42 to each other. Thus, the setting unit 28 connects the sensor A and the application 1 to each other and registers connection information indicating the connection relationship in the configuration management information in association with each of the sensor A and the application 1. The setting unit 28 connects the application 1, as a configuration to which data is to be input (transmitted), to the sensor A. In addition, the setting unit 28 connects the sensor A, as a configuration that inputs (transmits) data to the application 1, to the application 1. The connection information associated with the sensor A includes the software identification information indicating the application 1, which is the configuration as a connection partner and the configuration to which data is to be input (transmitted). The connection information associated with the application 1 includes the device identification information indicating the sensor A, which is the configuration as a connection partner and the configuration that inputs (transmits) data to the application 1. By referring to the connection information associated with the sensor A, the application 1 is identified as the data input destination. By referring to the connection information associated with the application 1, the sensor A is identified as the configuration that inputs data to the application 1. At the time of execution of a collaborative function, data is input (transmitted) in a direction indicated by the arrow image 56. That is, data is input (transmitted) from the sensor A to the application 1.

In addition, the device image 40 and the software image 44 are connected to each other via an arrow image 58, and thus, the sensor A is connected to the application 2, in addition to the application 1, as the configuration to which data is to be input. Accordingly, the connection information associated with the sensor A includes the software identification information indicating the application 2, which is the configuration to which data is to be input.

Furthermore, the software image 42 and the software image 46 are connected to each other via an arrow image 60, and thus, the application 1 is connected to the application 3 as a configuration to which data is to be input. Accordingly, the connection information associated with the application 1 includes the device identification information indicating the sensor A as a configuration that inputs data to the application 1 and the software identification information indicating the application 3 as a configuration to which data is to be input.

Furthermore, the software image 44 and the software image 46 are connected to each other via an arrow image 62, and the software image 44 and the device image 48 are connected to each other via an arrow image 64. Thus, the application 2 is connected to the application 3 and the robot C each as a configuration to which data is to be input. Accordingly, the connection information associated with the application 2 includes the device identification information indicating the sensor A, which is a configuration that inputs data to the application 2; the software identification information indicating the application 3, which is a configuration to which data is to be input; and the device identification information indicating the robot C, which is a configuration to data is to be input.

Furthermore, the software image 46 and the software image 50 are connected to each other via an arrow image 66, the software image 46 and the software image 52 are connected to each other via an arrow image 68, and the software image 46 and the device image 54 are connected to each other via n arrow image 70. Thus, the application 3 is connected to the application 4, the application 5, and the multi-function peripheral B each as a configuration to which data is to be input. Accordingly, the connection information associated with the application 3 includes the software identification information indicating each of the applications 1 and 2, which are configurations that into data to the application 3; the software identification information indicating each of the applications 4 and 5, which are configurations to which data is to be input; and the device identification information indicating the multi-function peripheral B, which is a configuration to which data is to be input. In addition, the connection information associated with the application 4 includes the software identification information indicating the application 3, which is a configuration that inputs data to the application 4. The connection information of each of the application 5 and the multi-function peripheral B also includes the software identification information indicating the application 3, which is a configuration that inputs data.

The same applies to the other configurations. For example, the device image 48 and the device image 54 are connected to each other via an arrow image 72. Thus, the robot c is connected to the multi-function peripheral B as a configuration to which data is to be input.

The configuration images are arranged in at least one input display region and the output display region by a user operation, and the configuration images are connected to each other via arrow images by a user operation. Also, an instruction for setting a collaborative function is given by the user. In this case, the setting unit 28 registers the configurations in the configuration management information in association with their roles. In addition, the setting unit 28 also registers a combination of the configurations and the collaborative function in the setting details management information, the configurations being associated with the configuration images that are connected to each other, the collaborative function being specified as a function to be executed by the plurality of configurations.

In the example illustrated in FIG. 4, the setting unit 28 registers, in the setting details management information, a combination of the sensor A, the applications 1, 3, and 4, and collaborative functions that are specified as functions to be executed by the sensor A and the applications 1, 3, and 4. The registered details include information indicating processes (input process and output process) to be executed by each of the sensor A and the applications 1, 3, and 4. In a case where data is input (transmitted) from the application 2 to the application 3, the sensor A and the applications 1, 2, 3, and 4 may be registered as a group to be used for a collaborative function. The same applies to the other configurations. That is, a combination of the sensor A and the applications 1, 3, and 5; a combination of the sensor A, the applications 1 and 3, and the multi-function peripheral B; a combination of the sensor A and the applications 2, 3, and 4; a combination of the sensor A and the applications 2, 3, and 5; a combination of the sensor A, the applications 2 and 3, and the multi-function peripheral B; and a combination of the sensor A, the application 2, the robot C, and the multi-function peripheral B are registered in the setting details management information together with the collaborative functions to be executed by the respective combinations.

Now, a process flow during execution of a collaborative function will be described.

For example, in a case where execution of a registered collaborative function is set to be active (on), if a condition is satisfied, the collaborative function is executed. In a case where execution of the collaborative function is set to be off, even if a condition is satisfied, the collaborative function is not executed. The on or off of the execution is set by a user, for example. It is needless to say that the collaborative function may be executed every time the condition is satisfied without setting the on and off.

For example, in a case where execution of the collaborative function is set to be active (on), if the first input condition associated with the sensor A is satisfied, the sensor A as the first input configuration executes the first input process associated with the sensor A. The sensor A is connected to the applications 1 and 2 each as the second input configuration. Accordingly, the sensor A inputs (transmits) data (e.g., data detected by the sensor A or the like) to the applications 1 and 2. In this manner, in a case where a configuration image associated with an input configuration is joined to a plurality of configuration images, data is input (transmitted) to the plurality of configurations. The same applies to the following description.

If the second input condition associated with the application 1 is satisfied, the application 1 as the second input configuration executes the second input process associated with the application 1. For example, the second input condition is input of data from the sensor A to the application 1. The application 1 is connected to the application 3 as the third input configuration. Accordingly, the application 1 inputs (transmits) data (e.g., data generated through a process executed by the application 1, data used for the process, or data collected by the application 1) to the application 3.

If the second input condition associated with the application 2 is satisfied, the application 2 as the second input configuration executes the second input process associated with the application 2. For example, the second input condition is input of data from the sensor A to the application 2. The application 2 is connected to the application 3 and the robot C each as the third input configuration. Accordingly, the application 2 inputs (transmits) data (e.g., data generated through a process executed by the application 2, data used for the process, or data collected by the application 2) to the application 3 and the robot C.

If the third input condition associated with the application 3 is satisfied, the application 3 as the third input configuration executes the third input process associated with the application 3. For example, the third input condition is input of data from at least one of the applications 1 and 2 the application 3. The application 3 is connected to the applications 4 and 5 and the multi-function peripheral B each as the output configuration. Accordingly, the application 3 inputs (transmits) data (e.g., data generated through a process executed by the application 3, data used for the process, or data collected by the application 3) to the applications 4 and 5 and the multi-function peripheral B.

If the third input condition associated with the robot C is satisfied, the robot C as the third input configuration executes the third input process associated with the robot C. For example, the third input condition is input of data from the application 2 to the robot C. The robot C is connected to the multi-function peripheral B as the output configuration. Accordingly, the robot C inputs (transmits) data (e.g., data generated through a process executed by the robot C, data used for the process, or data collected by the robot C) to the multi-function peripheral B.

If the output condition associated with the application 4 is satisfied, the application 4 as the output configuration executes the output process associated with the application 4. For example, the output condition is input of data from the application 3 to the application 4. The application 4 executes a final output process. Thus, the collaborative function using the sensor A and the applications 1, 3 and 4, the collaborative function using the sensor A and the applications 2, 3, and 4, or the collaborative function using the sensor A and the applications 1, 2, 3, and 4 is completed. These collaborative processes differ according to the data input (transmission) destination.

If the output condition associated with the application 5 is satisfied, the application 5 as the output configuration executes the output process associated with the application 5. For example, the output condition is input of data from the application 3 to the application 5. The application 5 executes a final output process. Thus, the collaborative function using the sensor A and the applications 1, 3 and 5, the collaborative function using the sensor A and the applications 2, 3, and 5, or the collaborative function using the sensor A and the applications 1, 2, 3, and 5 is completed. These collaborative processes differ according to the data input (transmission) destination.

If the output condition associated with the multi-function peripheral B is satisfied, the multi-function peripheral B as the output configuration executes the output process associated with the multi-function peripheral B. For example, the output condition is input of data from at least one of the application 3 and the robot C to the multi-function peripheral B. The multi-function peripheral B executes a final output process. Thus, the collaborative function using the sensor A, the applications 1 and 3, and the multi-function peripheral B, the collaborative function using the sensor A, the applications 2 and 3, and the multi-function peripheral B, the collaborative function using the sensor A, the applications 1, 2, and 3, and the multi-function peripheral B, the collaborative function using the sensor A, the application 2, the robot C, and the multi-function peripheral B, and the collaborative function using the sensor A, the applications 1, 2, and 3, the robot C, and the multi-function peripheral B is completed.

Although the configuration images are displayed in all of the input display regions in the example illustrated in FIG. 4, the configuration images may be displayed in only one or more input display regions. For example, in a case where configuration images are displayed in the first input display region 32 and the output display region 38 and are joined to each other, the setting unit 28 connects the first input configuration and the output configuration to each other. In this case, the first input configuration and the output configuration execute a collaborative function. In addition, no configuration image may be displayed in one or more input display regions. For example, configuration images may be displayed in the first input display region 32, the third input display region 36, and the output display region 38, and no configuration image may be displayed in the second input display region 34. In a case where the first input configuration is connected to the third input configuration, data is input from the first input configuration to the third input configuration.

Now, a configuration management table as an example of the configuration management information will be described with reference to FIG. 5. Details of the configuration management table reflect the connection relationship between the configurations illustrated in FIG. 4.

In the configuration management table, as an example, the following pieces of information are associated with each other: an ID, configuration identification information for identifying a configuration, information indicating a role that is associated with the configuration, information indicating details of a process that is associated with the configuration, information indicating a condition for executing the process, and connection information (information indicating a connection relationship) indicating another configuration that is connected to the configuration.

For example, the sensor A is associated with the first input process as a role. Specific details of the first input process are input (transmission) of data detected by the sensor A to other configurations. The input condition is detection by the sensor A. The sensor A is connected to the applications 1 and 2 each as a configuration to which data is to be input. For example, in a case where the sensor A detects a temperature or the like, the sensor A inputs the detected data to the applications 1 and 2. Setting details for other configurations are also registered in the configuration management table like the sensor A.

Specific process details (input process or output process) of the respective configurations and conditions therefor (input condition or output condition) are specified by a user. For example, one or more candidates for specific process details are determined in advance for each configuration, and the user specifies specific process details from among the one or more candidates. Specifically, in a case where the user specifies a configuration image on the screen 30, the display control unit 26 causes information to be displayed on the screen 30, the information indicating one or more candidates for process details that are executable by using a configuration that is associated with the configuration image. Then, the user specifies specific process details of the configuration from among the one or more candidates on the screen 30. The input condition or the output condition is specified in the same manner. In addition, by referring to the independent function management table, the display control unit 26 may identify one or more independent functions that correspond with the configuration specified by the user, and may cause information indicating the one or more independent functions to be displayed on the screen 30 as information indicating specific process details that are executable by using the configuration. In this case, the user specifies specific process details of the configuration from among the one or more independent functions. The specific process details and condition that are specified in this manner are associated with the configuration and registered in the configuration management table.

In the exemplary embodiment, the setting unit 28 changes setting details of a collaborative function in accordance with a type of a connection line (e.g., an arrow image) for connecting the configuration images to each other. For example, in accordance with the type of the connection line, the setting unit 28 may change a type of data to be input (transmitted) to another configuration, may change a timing for executing the collaborative function, or may change a data transmission speed. The type of the connection line is determined by, for example, color, thickness, a length, or a line type in a narrow sense (e.g., a solid line, a dashed line, a dot-and-dash line, a curved line, or a zigzag line). By changing the type of the connection line, setting details of the collaborative function can be changed. For example, the color of the connection line indicates the type of data to be input to another configuration, the thickness of the connection line indicates a communication performance for transmitting (inputting) data, and the length of the connection line indicates a timing for executing a process assigned to the configuration (e.g., a time period from data reception of the configuration until execution of the process assigned to the configuration).

Note that the concept of the type of data encompasses, for example, a physical value such as a temperature, a humidity, or a pressure, a data format, a data collecting period, and the like. For example, temperature data and humidity data differ from each other in terms of the type. In addition, image data and audio data differ from each other in terms of the type. Furthermore, the temperature data collected in a certain period (e.g., in January) and the temperature data collected in another period (e.g., in February) differ from each other.

Now, the type of the connection line will be described in detail with reference to FIG. 4. For example, the arrow image 56 as a connection line is blue, and the arrow image 58 as a connection line is red. Although the arrow image 58 is represented by a dashed line for the convenience of description, the arrow image 58 may be a solid line. As illustrated in FIG. 3, the sensor A has a detection function including a temperature detection function, a humidity detection function, and the like, and outputs detected temperature data, humidity data, and the like. For example, output of the humidity data corresponds to the blue connection line, and output of the temperature data corresponds to the red connection line. As the arrow image 56 is blue, the arrow image 56 represents output of the humidity data. As the arrow image 58 is red, the arrow image 58 represents output of the temperature data. Thus, the humidity data detected by the sensor A is input (transmitted) from the sensor A to the application 1, and the temperature data detected by the sensor A is input (transmitted) from the sensor A to the application 2. The setting unit 28 registers, in the setting details management information, information indicating that the data to be input (transmitted) from the sensor A to the application 1 is the humidity data, and registers, in the setting details management information, information indicating that the data to be input (transmitted) from the sensor A to the application 2 is the temperature data. At the time of execution of a collaborative function, in accordance with details registered in the setting details management information, the sensor A inputs the humidity data to the application 1, and inputs the temperature data to the application 2. The same applies to other connection lines. By changing the color of each of the arrow images, a user can change data to be input to another configuration with ease.

In addition, the thickness of the connection line may represent the communication performance for transmitting (inputting) data. For example, the thickness of the communication line represents the communication speed, the communication order, or the like. The thicker the communication line is, the higher communication speed is or the higher communication order is. For example, when the arrow images 62, 68, and 70 are compared with one another, the line representing the arrow image 62 is the thickest, the line representing the arrow image 70 is the second thickest, and the line representing the arrow image 68 is the third thickest. In this case, a communication line with the highest communication speed is used between the applications 2 and 3 among between the applications 2 and 3, between the applications 3 and 5, and between the application 3 and the multi-function peripheral B. In addition, a communication path with the second highest communication speed is used between the application 3 and the multi-function peripheral B, and a communication path with the third highest communication speed is used between the applications 3 and 5. The setting unit 28 registers information indicating a communication performance corresponding to the thickness of each of the arrow images in the setting details management information. At the time of execution of a collaborative function, the application 2 inputs data to the application 3 at a communication speed corresponding to the thickness of the arrow image 62. The same applies to the other configurations. By changing the thickness of each of the arrow images, a user can change the performance of communication established between the configurations with ease.

In addition, the length of the communication line may represent information indicating the timing for executing a process. For example, the longer the communication line is, the longer the period of time is from when a configuration receives data to when the configuration executes a process. That is, the longer the distance is between configuration images that are connected to each other, the longer the period of time is before execution of a process. A specific example will be described. The arrow image 56 is longer than the arrow image 58. In this case, the period of time from when the application 1 receives humidity data from the sensor A to when the application 1 executes a process assigned to the application 1 is longer than the period of time from when the application 2 receives temperature data from the sensor A to when the application 2 executes a process assigned to the application 2. In a case where data is input from the sensor A to the applications 1 and 2 simultaneously, the application 2 performs a process prior to the application 1. The setting unit 28 registers, in the setting details management information, information indicating the execution timing corresponding to the length of each arrow image (length between configuration images). At the time of execution of a collaborative function, each configuration executes a process in accordance with the execution timing based on the length of the arrow image that is connected to the configuration. By changing the length of each of the arrow images, a user can change the timing at which each configuration executes a process. For example, if a user changes a display position of a configuration image, the length of the arrow image that is connected to the configuration image is changed, and thus, the timing at which the configuration executes a process is changed.

In the above-described manner, setting details of the collaborative function can be changed in accordance with the type of the connection line (e.g., an arrow image) that connects configurations to each other. That is, by changing the type of the connection line, setting details of the collaborative function can be changed. The display control unit 26 changes display of connection between configuration images (e.g., display of an arrow image) between first setting details of a collaborative function (details of a collaborative function that is set by connecting the configuration images to each other via a certain type of a connection line) and second setting details (details of a collaborative function that is set by connecting the configuration images to each other via another type of a connection line).

The display control unit 26 may cause information indicating the timing at which each configuration executes a process to be displayed on the screen 30. For example, as illustrated in FIG. 6, the display control unit 26 causes timing information (e.g., "0:00" or "0:50") to be displayed on the screen 30 in association with each configuration image. For example, by using as a reference the timing at which the sensor A, which is the first input configuration, executes a process (e.g., the timing of data detection), the control unit 24 calculates the timing at which each configuration executes a process on the basis of a distance between the device image 40 associated with the sensor A and each configuration image. The longer the distance is, the later the execution timing is. As a specific example, the control unit 24 calculates the execution timing in accordance with a distance between the device image 40 and the software image 44, and the display control unit 26 causes information indicating the execution timing (e.g., "0:50") to be displayed on the screen 30 in association with the software image 44. This information indicates that the application 2 executes a process associated with the application 2 when 50 seconds elapses from the time point at which the sensor A executes a process.

As another example, the control unit 24 may calculate the timing at which each configuration executes a process on the basis of the length of the connection line (arrow image). The longer length is, the later the execution timing is. As a specific example, the control unit 24 calculates the execution timing in accordance with the length of the arrow image 58 that connects the device image 40 and the software image 44 to each other. For a configuration that is arranged in the following stage, the control unit 24 calculates a timing at which the configuration executes a process on the basis of a sum of the lengths of one or more connection lines (arrow images) before the configuration. As a specific example, the control unit 24 calculates the execution timing in accordance with the sum of the lengths of the arrow images 56, 60, and 66, and the display control unit 26 causes information indicating the execution timing ("5:00") to be displayed on the screen 30 in association with the software image 50.

The timings obtained in the above manner are theoretical values obtained on the basis of the distance between images or the length(s) of a connection line(s) and may actually vary depending on the communication speed or processing speed.

By using as a reference the timing at which the sensor A executes a process, the time (predicted time) elapsed from the reference is displayed as the execution timing of each configuration in the above example. However, a time in accordance with the distance between configurations (the length of the connection line) may alternatively be displayed. For example, the display control unit 26 causes information indicating the time in accordance with the distance between the device image 40 and the software image 42 (the length of the arrow image 56), information indicating the time in accordance with the distance between the software images 42 and 46 (the length of the arrow image 60), or the like, to be displayed on the screen 30. The same applies to the other configurations. That is, the time in accordance with the length between configuration images may be displayed without using the sensor A as a reference.

In a case where a user specifies a configuration image on the screen 30, the display control unit 26 may cause candidates for connection lines to be displayed on the screen 30. For example, in a case where a user performs an operation for specifying a configuration image (e.g., presses and holds the configuration image) for a predetermined period of time or longer, the display control unit 26 refers to the independent function management table to identify one or more output details of a device 12 or software that is associated with the configuration image. The display control unit 26 then causes candidates for connection lines (e.g., arrow images) to be displayed on the screen 30 in association with the configuration image. The types of the connection lines correspond to the respective output details.

For example, as illustrated in FIG. 7, in a case where a user performs an operation for specifying the device image 40 associated with the sensor A for a predetermined period of time or longer, the display control unit 26 refers to the independent function management table to identify one or more output details of the sensor A. The display control unit 26 then causes a candidate group 74 of connection lines to be displayed on the screen 30 in association with the device image 40. The types of the connection lines correspond to the respective output details. Candidates for the arrow images (connection lines) included in the candidate group 74 represent output of temperature data, output of humidity data, and the like, in the example illustrated in FIG. 7, the candidates for the arrow images are arranged in a circle for display. In addition, each arrow image may be displayed while rotating in the direction of a circular arc arrow, in accordance with a user's rotating operation or automatically. The user selects a target arrow image (an arrow image representing output of data desired by the user) from the candidate group 74 and connects a point of the arrow image to a configuration image associated with a configuration that executes a process subsequently to the sensor A. For example, the arrow image is an extensible image, and the user extends the arrow image to connect the point thereof to the configuration image (e.g., the software image 42 or 44) associated with the subsequent configuration. Thus, the device image 40 and the subsequent configuration image are connected to each other, and the sensor A and the configuration associated with the subsequent configuration image are connected to each other. Note that a nock of the arrow image is automatically connected to the device image 40 associated with the sensor A.

The same applies to the other configuration images. In addition, even for a configuration image that is already connected to another configuration image, in a case where a user specifies the configuration image, the display control unit 26 may cause a candidate group of connection lines to be displayed on the screen 30, and the user may select another connection line from the candidate group. This makes it possible to change output details from a configuration associated with the configuration image.

As illustrated in FIG. 8, it is assumed that a user select an arrow image 76, for example, from the candidate group 74. For example, in a case where the user's touch operation stops at a display position of the arrow image 76 in the candidate group 74 or the user performs a flick operation on the arrow image 76, the arrow image 76 is selected, and the display control unit 26 no longer displays the candidates other than the arrow image 76.

Although the arrow image 76 alone is selected in this example, a plurality of arrow images may also be selected. The user may select a plurality of arrow images included in the candidate group 74 by a multi-touch operation or may select a plurality of arrow images by a touch operation on a region including the plurality of arrow images.

Note that an arrow image may be selected by audio.

FIG. 9 illustrates another example of the candidate group. In a case where a user performs an operation for specifying the device image 40 for a predetermined period of time or longer, the display control unit 26 causes a box image 78 to be displayed on the screen 30 in association with the device image 40. In the box image 78, as in the above candidate group 74, one or more candidates for arrow images (connection lines) are displayed. The user extracts a target arrow image to the outside of the box image 78 from among the one or more candidates displayed in the box image 78. Thus, the display control unit 26 causes the target arrow image to displayed outside the box image 78. Subsequently, as described above, the user connects the target arrow image to another configuration image so as to connect the device image 40 to the other configuration image. In a case where the user performs an operation for closing the box image 78, the display control unit 26 no longer displays the box image 78.

In addition, in accordance with another configuration image other than the configuration image specified by the user, the display control unit 26 may change the arrow images in the candidate group. The other configuration image is, for example, a configuration image that is predicted to be connected to the configuration image specified by the user. The predicted configuration image is a configuration image displayed in the following display region of the configuration image specified by the user.

For example, the type of processable data is determined in advance for each configuration and management information indicating the determination is stored in advance in the storage unit 22. As a specific example, it is assumed that the application 1 has a function by which temperature data and humidity data is processable. In this case, the software identification information of the application 1 corresponds to, as the type of processable data, information indicating each of the temperature data and the humidity data, and the information is registered in advance in the above management information. The same applies to the other configurations. By referring to the independent function management table, the display control unit 26 identifies output details of a configuration associated with a configuration image specified by the user. In addition, by referring to the management information, the display control unit 26 identifies the type of data that is processable by another configuration associated with another configuration image displayed on the screen 30. From the candidate group of arrow images that reflect output details of the configuration specified by the user, the display control unit 26 causes one or more candidates representing the type of data that is processable by the other configuration to be displayed on the screen 30.

A specific example will be described below. In a case where the device image 40 associated with the sensor A is specified (e.g., pressed and held) by a user, the display control unit 26 identifies the sensor A as a configuration specified by the user. Since the device image 40 is displayed in the first input display region 32, the display control unit 26 predicts a configuration image displayed in the second input display region 34, which is the following display region of the first input display region 32, as a configuration image to be connected to the device image 40. Since the software images 42 and 44 are displayed in the second input display region 34, the display control unit 26 predicts the software images 42 and 44 as configuration images to be connected to the device image 40. By referring to the independent function management table, the display control unit 26 identifies output details of the sensor A, and further, by referring to the above management information, the display control unit 26 identifies the type of data that is processable by the applications 1 and 2 associated with the software images 42 and 44, respectively. Subsequently, the display control unit 26 causes one or more candidates to be displayed on the screen 30, the one or more candidates representing the type of data that is processable by each of the applications 1 and 2 from the candidate group (e.g., the candidate group 74) of arrow images that reflect output details of the sensor A. For example, it is assumed that the sensor A can output temperature data, humidity data, pressure data, and the like as output details, that the application 1 has a function by which temperature data and humidity data are processable, and that the application 2 has a function by which temperature data is processable. In this case, the display control unit 26 does not cause candidates representing temperature data, humidity data, and pressure data to be displayed on the screen 30, but causes candidates representing temperature data and humidity data to be displayed on the screen 30, as the candidate group of arrow images (connection lines) for the sensor A. That is, since the applications 1 and 2 do not have a function of processing pressure data, candidates representing input of pressure data is not displayed on the screen 30. Thus, in accordance with the other configuration image that is predicted to be connected to the configuration image specified by the user, the candidates for arrow images (connection lines) can be narrowed down.

In a case where a user specifies the device image 40 and the software image 42, the display control unit 26 may cause candidates representing one or more data items to be displayed on the screen 30. The one or more data items are processable by the application 1 in a group of data items (e.g., temperature data, humidity data, and pressure data) that can be output from the sensor A and are, for example, temperature data and humidity data.

In a case where a user specifies an arrow image (a connection line) that connects configuration images to each other, the display control unit 26 may cause information for changing the arrow image to be displayed on the screen 30. This process will be described with reference to FIG. 10. For example, in a case where the user specifies the arrow image 56 on the screen 30, the display control unit 26 causes a box image 80 to be displayed on the screen 30. By referring to the independent function management table, the display control unit 26 identifies types of data that can be output from the sensor A, and causes candidates for arrow images representing the types of data to be displayed within the box image 80. Upon the user specifying one of the candidates in the box image 80, the display control unit 26 connects the candidate, instead of the arrow image 56 specified by the user, to the device image 40 and the software image 42, and causes the candidate to be displayed on the screen 30. Thus, the arrow image (connection line) can be changed with ease.

A user may change a thickness of an arrow image. In accordance with the change, the communication performance between configurations connected via the arrow image is changed.

Note that the arrow image may be specified and changed by audio input.

In accordance with the change of the timing at which a configuration executes a process, the display control unit 26 may change a display position of a configuration image associated with the configuration. This process will be described with reference to FIG. 11. For example, in a case where a user changes the execution time "0:50" associated with the software image 44 to the execution time "1:30", the display control unit 26 changes a display position of the software image 44 (display position corresponding to "0:50") to a display position corresponding to the execution time "1:30", and causes the software image 44 to be displayed at the display position after change. That is, as illustrated by an arrow image 82, the display control unit 26 moves the software image 44 from the display position corresponding to the execution time "0:50" to the display position corresponding to the execution time "1:30" on the screen 30. This makes it possible to present the execution timing to a user by displaying the configuration image at the display position reflecting the execution timing. Note that information indicating the execution time after change may be input to the terminal apparatus 10 by inputting numerals with a keyboard or the like or may be input to the terminal apparatus 10 by audio.

Even if the configuration image has been moved, a connection state of arrow images that are already connected to the configuration image does not change. In the above example, the arrow images 58, 62, and 64 are already connected to the software image 44, and even if the software image 44 has been moved, the state where the arrow images 58, 62, and 64 are connected to the software image 44 is maintained.

Figure 12:
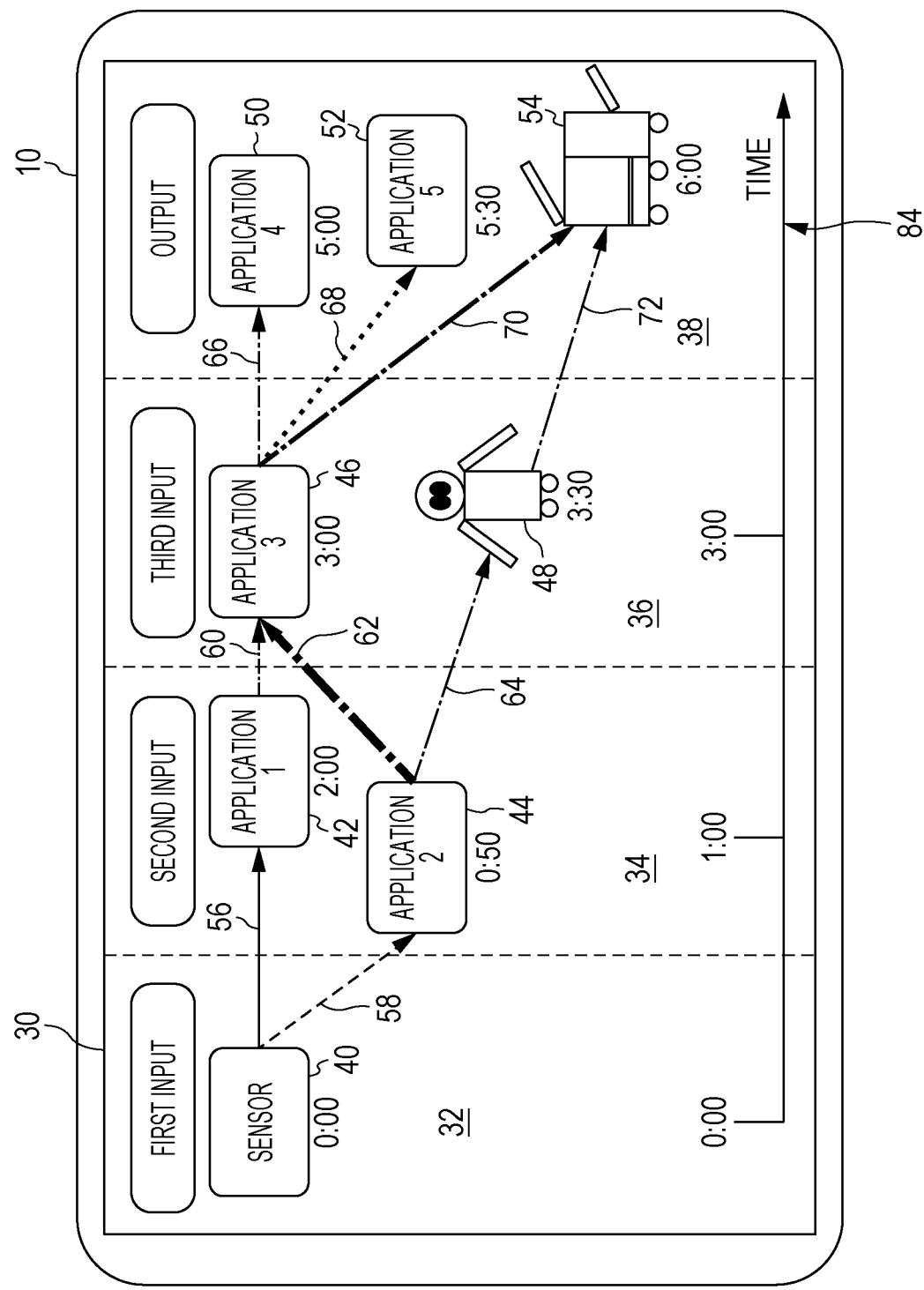
FIG. 12 illustrates a screen.

As illustrated in FIG. 12, the display control unit 26 may cause a time axis 84 to be displayed on the screen 30. The time axis 84 is displayed across a region from the first input display region 32 to the output display region 38 (a horizontal axis is displayed). The display control unit 26 may cause a rough estimation of the timing at which each configuration executes a process to be displayed on the time axis 84. This makes it possible to present the rough estimation of the execution timing to the user.

Note that the time axis may be displayed as a vertical axis (an axis intersecting the time axis 84) on the screen 30 or may be displayed as a combination of a horizontal axis and a vertical axis (a time axis for displaying a time corresponding to a length of an orthogonal connection line) on the screen 30.

Figure 13:
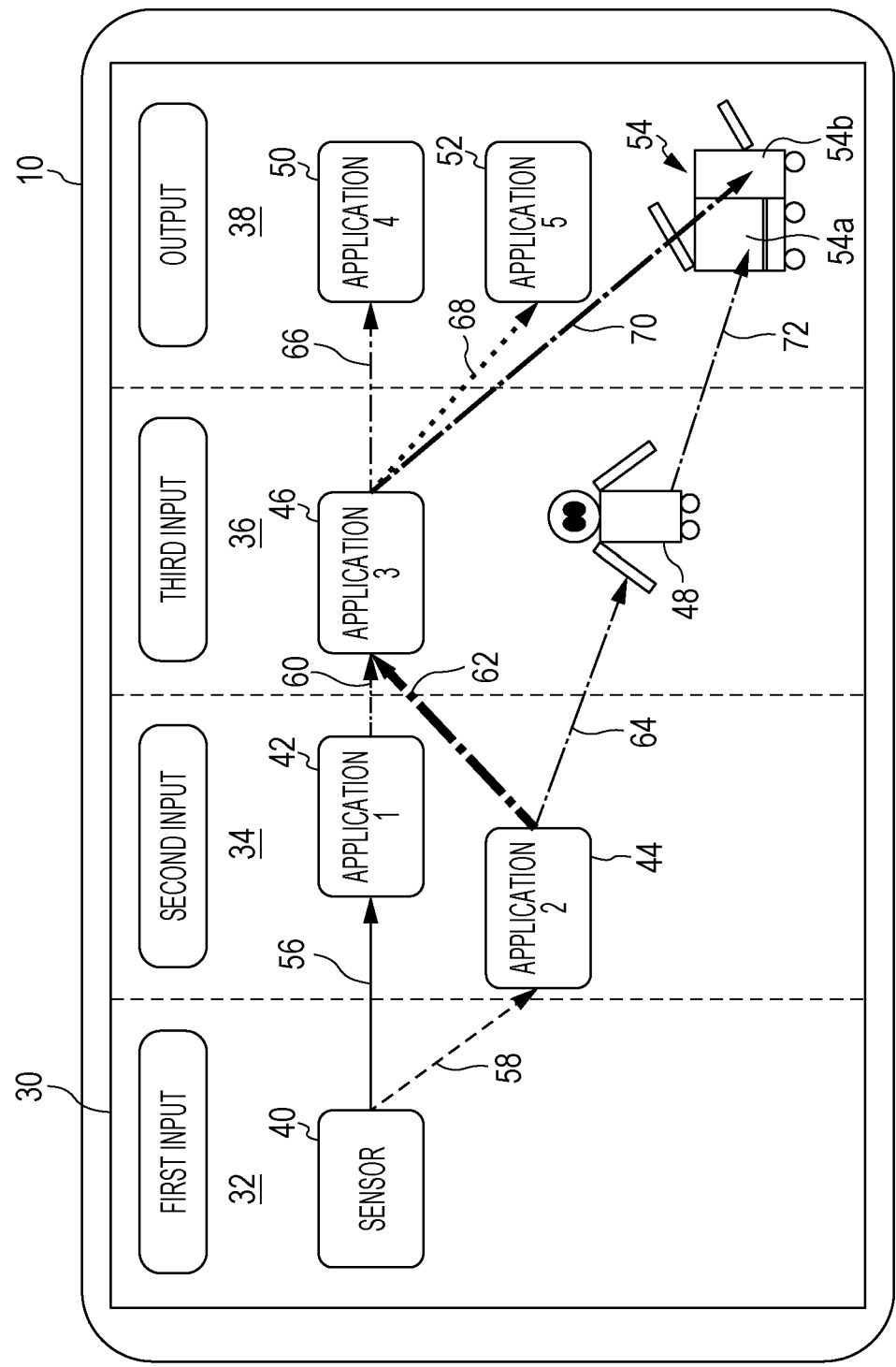
FIG. 13 illustrates a screen.

In a case where a function is assigned to each part of a configuration, the setting unit 28 may change setting details of a collaborative function in accordance with the part to which an arrow image is connected in a configuration image associated with the configuration. This process will be described with reference to FIG. 13. For example, it is assumed that the multi-function peripheral B includes a main part and a post-processing unit and that a print function, a scan function, and a copy function are assigned to the main part and a post-processing function such as a stapling function is assigned to the post-processing unit. In the device image 54 associated with the multi-function peripheral B, the print function, the scan function, and the copy function are associated with a part image 54a representing the main part, and the post-processing function is associated with a part image 54b representing the post-processing unit. Since a point of the arrow image 70 is connected to the part image 54b, this connection specifies the post-processing function associated with the part image 54b. In this case, the setting unit 28 registers, in the setting details management information, a collaborative function using the post-processing function of the multi-function peripheral B as a collaborative function using the application 3, the multi-function peripheral B, and the like. In addition, since a point of the arrow image 72 is connected to the part image 54a, this connection specifies the print function and the like associated with the part image 54a. In this case, the setting unit 28 registers, in the setting details management information, a collaborative function using the print function and the like of the multi-function peripheral B, as a collaborative function using the robot C, the multi-function peripheral B, and the like. In this manner, by changing a part of a configuration image to which an arrow image is connected, setting details of a collaborative function can be changed. Note that in a case where software has a plurality of functions, a function may be associated with each part of a software image associated with the software. Also in this case, a collaborative function in accordance with the part of the software image to which an arrow image is connected is set.

In addition, in a case where a plurality of configurations input data to the same configuration, the configuration may execute a process every time the configuration receives data from one of the plurality of configurations, or may calculate a plurality of data items by, for example, adding up the plurality of data items. A specific example will be described with reference to FIG. 13. The arrow image 60 from the software image 42 and the arrow image 62 from the software image 44 are connected to the software image 46. That is, data is input to the application 3 from each of the applications 1 and 2. The application 3 executes a process associated with the application 3 upon reception of all of data items from each of the applications 1 and 2 (i.e., if data is input to the application 3 from both of the applications 1 and 2). As another example, the application 3 may add data that is input to the application 3 from the application 1 and data that is input to the application 3 from the application 2. In the above manner, a process in accordance with a connection state of an arrow image (connection line) can be executed.

The setting unit 28 may change setting details of a collaborative function in accordance with a display position relationship between configuration images. The display position relationship is, for example, a relationship of a distance between the configuration images, a relationship of an angle between the configuration images, or the like.

Figure 14:
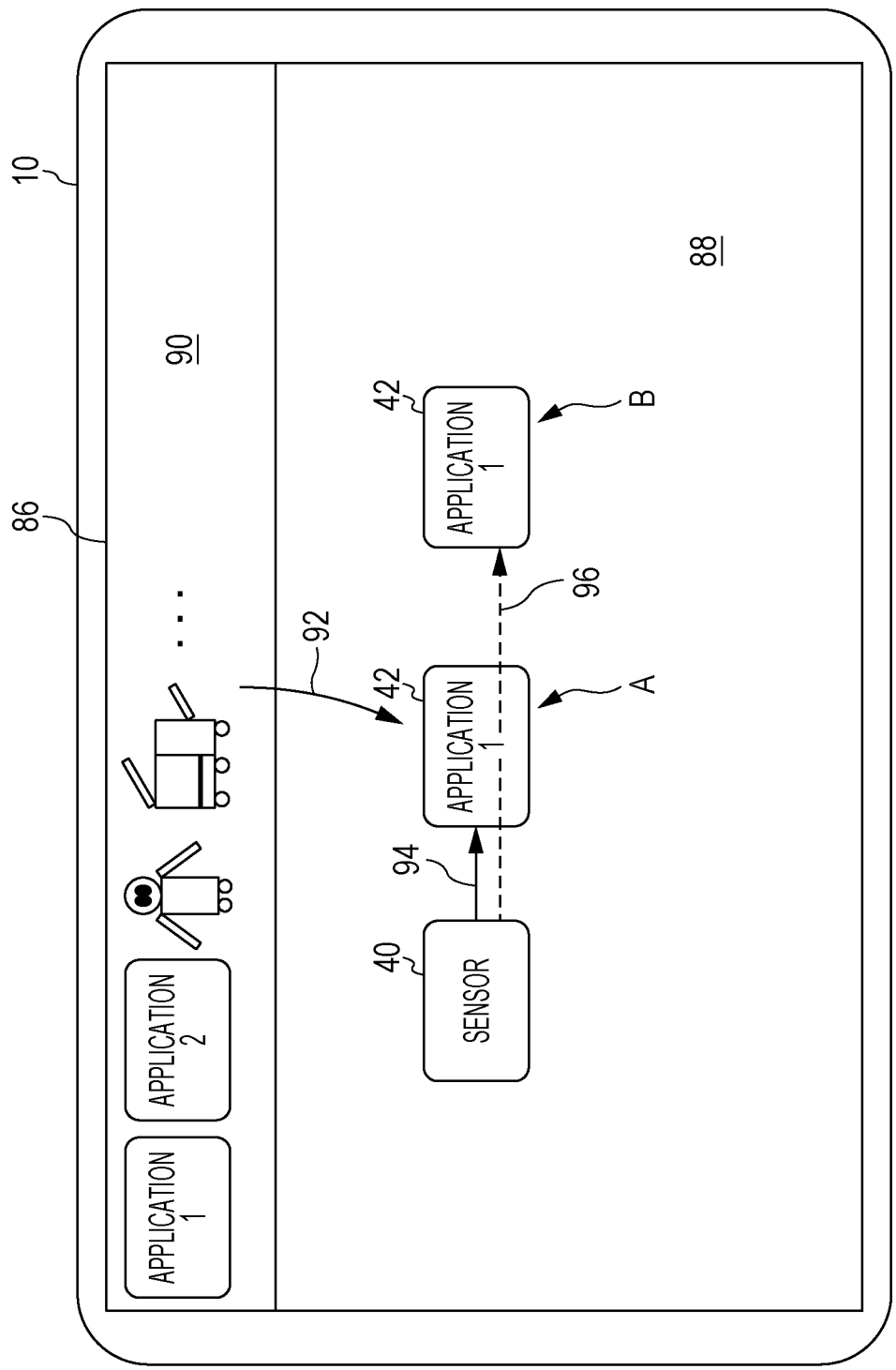
FIG. 14 illustrates a screen.

Now, a process for changing setting details of a collaborative function in accordance with the relationship of a distance between configuration images will be described with reference to FIG. 14. FIG. 14 illustrates an example of a screen. A screen 86 is different from the screen 30, and a collaborative function can also be set on the screen 86. For example, the screen 86 includes a main region 88 and a sub-region 90. In the main region 88, configuration images are connected to each other. In the sub-region 90, a group of configuration images is displayed. Configuration images associated with configurations that are registered in advance are displayed in the sub-region 90. A user can extract and move a target configuration image from the sub-region 90 to the main region 88 on the screen 86 as indicated by an arrow image 92. For example, the device image 40 associated with the sensor A and the software image 42 associated with the application 1 are displayed in the main region 88. The user can change a display position of each of the configuration images by operating the configuration image in the main region 88. In addition, as in the exemplary embodiment described above, the user can connect the configuration images to each other via an arrow image. For example, the software image 42 is displayed at a display position A, and the device image 40 and the software image 42 are connected to each other via an arrow image 94 representing input of humidity data. The arrow image 94 is an image representing an arrow from the device image 40 toward the software image 42. That is, at the time of execution of a collaborative function, the sensor A inputs humidity data to the application 1.

In a case where the user changes a display position of a configuration image that is connected to another configuration image via an arrow image, the display control unit 26 changes a type of the arrow image in accordance with a distance between the configuration images. For example, in a case where the user moves the software image 42 from the display position A to a display position B, the display control unit 26 changes the arrow image that connects the device image 40 and the software image 42 to each other from the arrow image 94 to an arrow image 96. The arrow image 96 is, for example, an image representing input of temperature data. That is, in a case where the software image 42 is displayed at the display position A and a distance between the device image 40 and the software image 42 falls within a distance range A, the display control unit 26 causes the arrow image 94 to be displayed on the screen 86 as an arrow image that connects the device image 40 and the software image 42 to each other. On the other hand, in a case where the software image 42 is displayed at the display position B and the distance between the device image 40 and the software image 42 falls within a distance range B, the display control unit 26 causes the arrow image 96 to be displayed on the screen 86 as the arrow image that connects the device image 40 and the software image 42 to each other. In the above manner, the display control unit 26 changes a type of an arrow image in accordance with a distance between configuration images.

In a case where a user gives an instruction for setting a collaborative function by operating the UI unit 20, the setting unit 28 registers, in the setting details management information, a data input process represented by an arrow image used for connection between configuration images at the time point when the setting instruction is given, as a process included in the collaborative function. Then, in a case where the user changes a type of the arrow image by changing a display position of a configuration image, the setting unit 28 changes the registered input process to a data input process represented by the arrow image after change. Thus, setting details of the registered collaborative function are changed.

For example, in a case where the user gives an instruction for setting a collaborative function while the software image 42 is displayed at the display position A, the setting unit 28 registers, in the setting details management information, information indicating that humidity data is to be input from the sensor A to the application 1, as information indicating setting details of the collaborative function. Then, in a case here the user moves the software image 42 from the display position A to the display position B, the setting unit 28 changes the setting details of the collaborative function, and registers, in the setting details management information, information indicating that temperature data is to be input from the sensor A to the application 1, as the information indicating the setting details of the collaborative function. In the above manner, the display control unit 26 changes a display position relationship between configuration images in accordance with setting details of a collaborative function.

Although the software image 42 at a point of an arrow image is moved in the example illustrated in FIG. 14, the device image 40 at a nock of the arrow image may also be moved. Also in this case, as in the above process, a type of the arrow image is changed in accordance with a distance between the device image 40 and the software image 42.

In addition, the setting unit 28 may change a function to be executed by the application 1 or may change a function to be executed by the sensor A in accordance with the distance between the device image 40 and the software image 42. Setting details of a collaborative function may also be changed by such an operation.

Furthermore, the setting unit 28 may change data to be acquired at the time of execution of the collaborative function in accordance with a distance between configuration images that are connected to each other. In an exemplary case, a collaborative function using map data is set. In this case, as the distance between configuration images is shorter, data of a larger scale map is used as the map data, and as the distance between configuration images is longer, data of a smaller scale map is used as the map data.

Now, a process for changing setting details of a collaborative function in accordance with an angular relationship between configuration images will be described with reference to FIG. 15. As in the example illustrated in FIG. 14, the device image 40 and the software image 42 are displayed in the main region 88. For example, the software image 42 is displayed at a display position C (a display position having a 0 degrees rotation angle relative to the display position of the device image 40), and the device image 40 and the software image 42 are connected to each other via an arrow image 100 representing input of humidity data. The arrow image 100 is an image representing an arrow from the device image 40 toward the software image 42. That is, at the time of execution of a collaborative function, the sensor A inputs humidity data to the application 1.

In a case where a user changes a display position of a configuration image that is connected to another configuration image via an arrow image, the display control unit 26 changes a type of the arrow image in accordance with a rotation angle of the configuration image. In an exemplary case, the user moves the software image 42 from the display position C to a display position D (a display position having a 90 degrees rotation angle) as indicated by a circular arc arrow 98. In this case, the display control unit 26 changes the arrow image that connects the device image 40 and the software image 42 to each other from the arrow image 100 to an arrow image 102. The arrow image 102 is, for example, an image representing input of temperature data. That is, in a case where the software image 42 is displayed at the display position C and has a 0 degrees rotation angle relative to the device image 40, the display control unit 26 causes the arrow image 100 to be displayed on the screen 86 as the arrow image that connects the device image 40 and software image 42 to each other. On the other hand, in a case where the software image 42 is displayed at the display position D and has a 90 degrees rotation angle relative to the device image 40, the display control unit 26 causes the arrow image 102 to be displayed on the screen 86 as the arrow image that connects the device image 40 and the software image 42 to each other. In the above manner, the display control unit 26 changes a type of an arrow image in accordance with an angular relationship between configuration images.

In a case where a user gives an instruction for setting a collaborative function by operating the UI unit 20, the setting unit 28 registers, in the setting details management information, a data input process represented by an arrow image used for connection between configuration images at the time point when the setting instruction is given, as a process included in the collaborative function. Then, in a case where the user changes a type of the arrow image by changing a display position (rotation angle) of a configuration image, the setting unit 28 changes the registered input process to a data input process represented by the arrow image after change. Thus, setting details of the registered collaborative function are changed.

Figure 15:
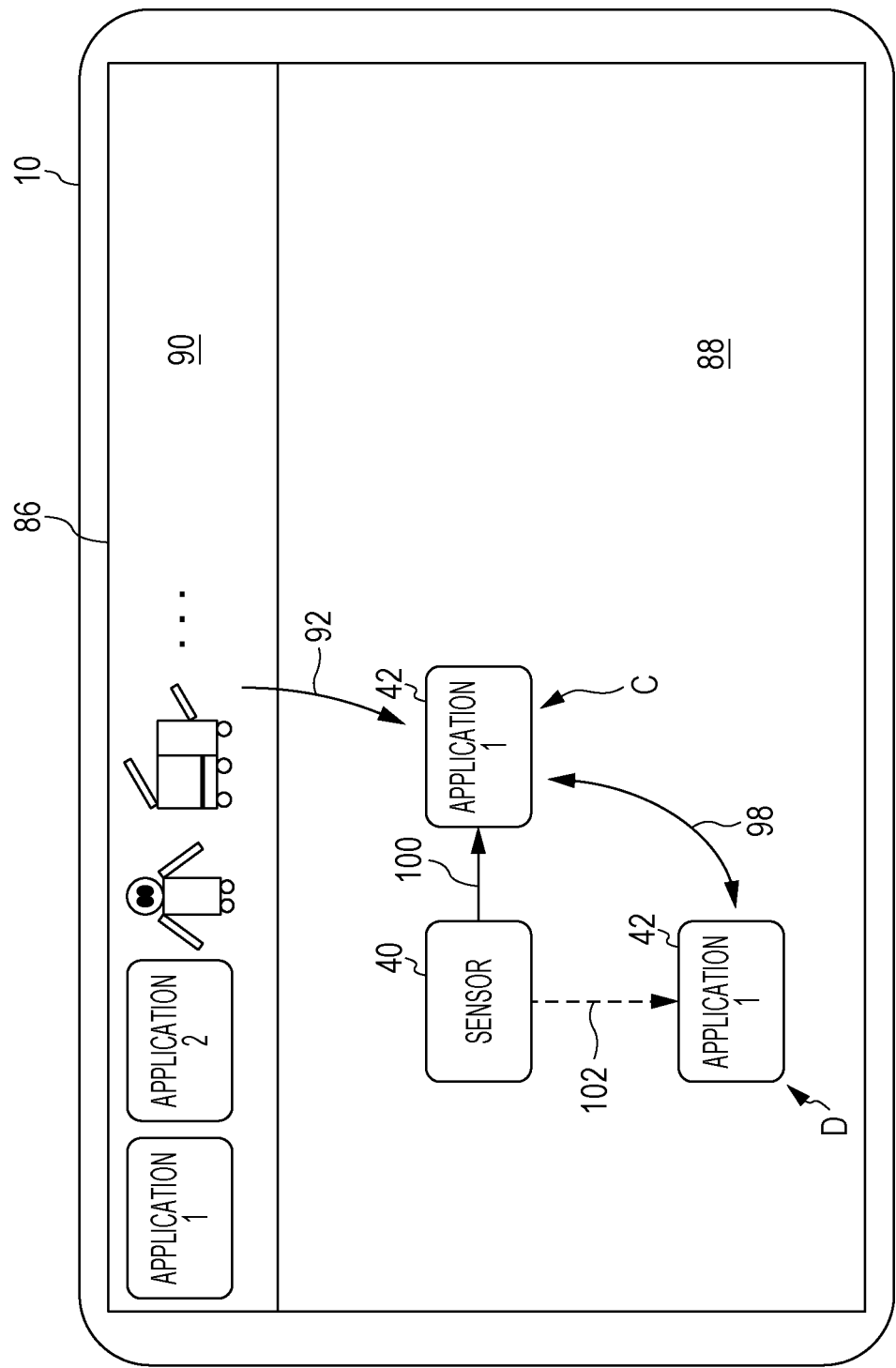
FIG. 15 illustrates a screen.

Although the software image 42 at a point of an arrow image is moved in the example illustrated in FIG. 15, the device image 40 at a nock of the arrow image may also be moved. Also in this case, as in the above process, a type of the arrow image is changed in accordance with an angular relationship between the device image 40 and the software image 42.

In addition, the setting unit 28 may change a function to be executed by the application 1 or may change a function to be executed by the sensor A in accordance with the angular relationship between the device image 40 and the software image 42. Setting details of a collaborative function may also be changed by such an operation.

Figure 16:
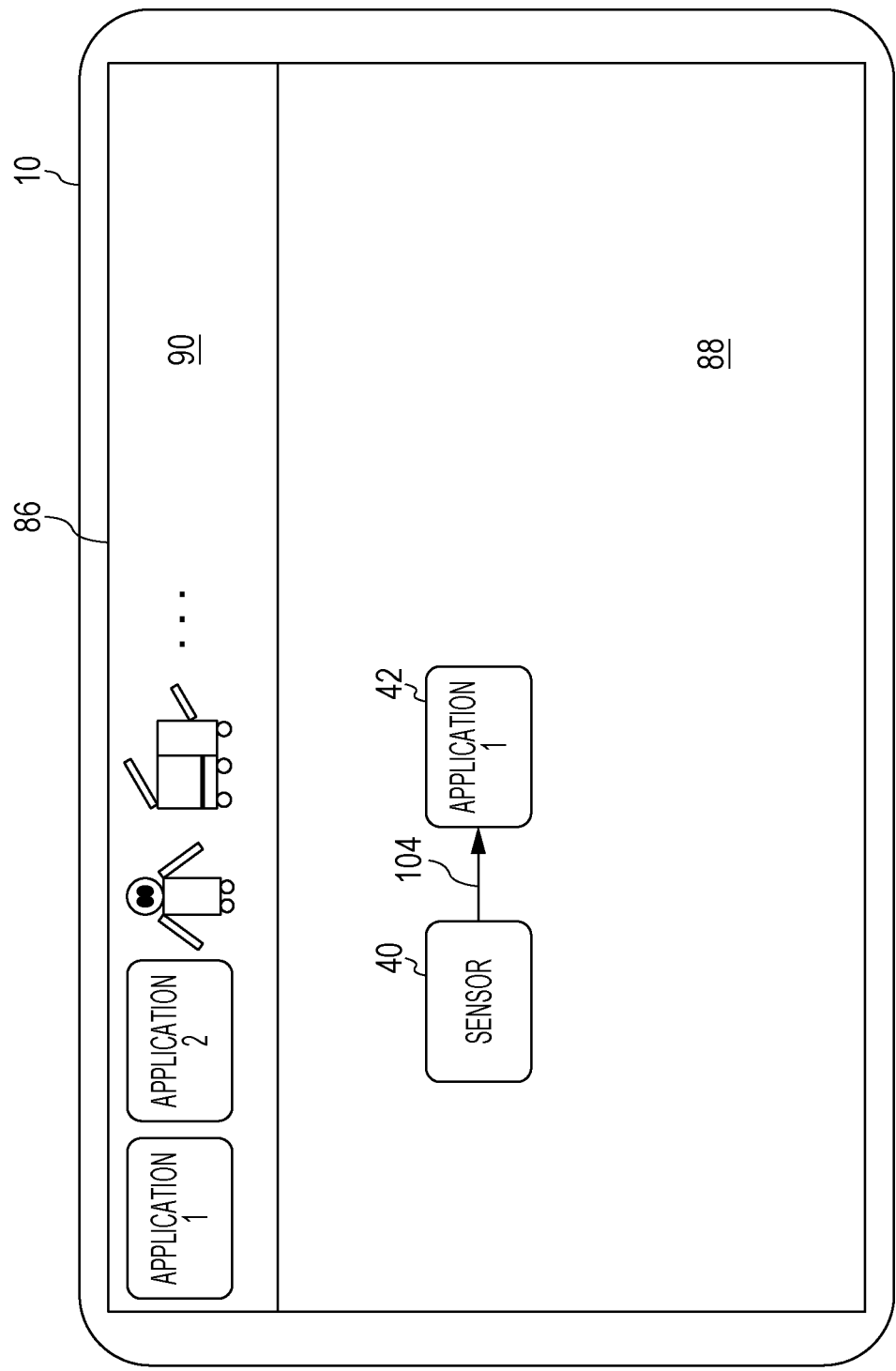
FIG. 16 illustrates a screen.

Furthermore, the type of the arrow image and the setting details of the collaborative function may also be changed in accordance with a size of a configuration image. This process will be described with reference to FIG. 16 and FIG. 17. As illustrated in FIG. 16, the device image 40 associated with the sensor A and the software image 42 associated with the application 1 are connected to each other via an arrow image 104. The arrow image 104 is an image representing a process for inputting humidity data to another configuration. The device image 40 is an image at a nock of an arrow image, and the software image 42 is an image at a point of the arrow image. At the time of execution of the collaborative function, humidity data is input from the sensor A to the application 1.

Figure 17:
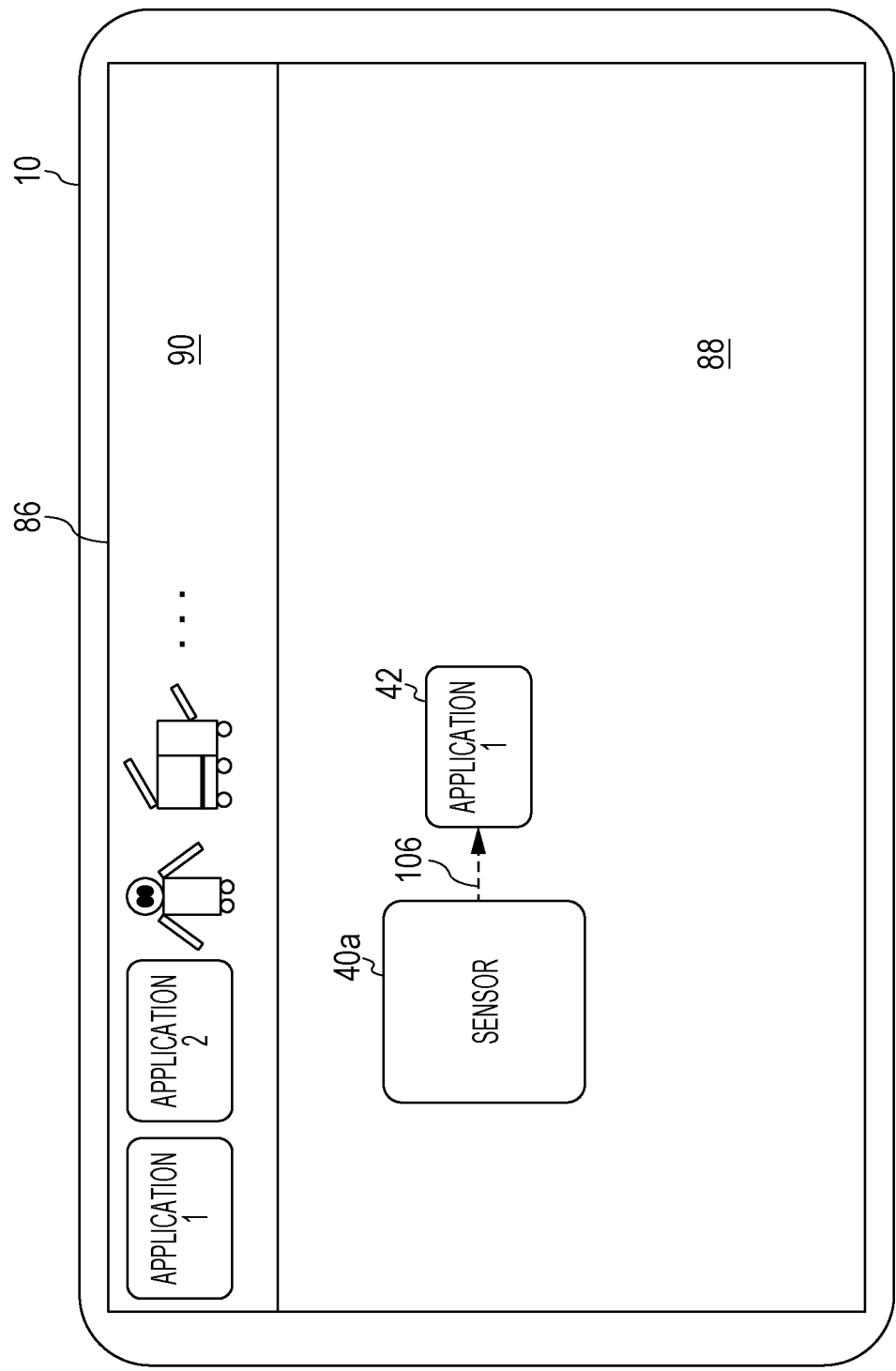
FIG. 17 illustrates a screen.

A user can change a size of each configuration image on the screen 86. For example, in a case where the user enlarges the device image 40 by operating the UI unit 20, as illustrated in FIG. 17, the display control unit 26 causes an enlarged device image 40a to be displayed on the screen 86. The device image 40a is associated with the sensor A. In this case, in accordance with the size of the device image, the display control unit 26 changes a type of the arrow image that extends from the device image. Instead of the arrow image 104 corresponding to the size of the device image 40, the display control unit 26 connects an arrow image 106, corresponding to the size of the device image 40a, to the device image 40a and the software image 42 and causes the arrow image 106 to be displayed on the screen 86. The arrow image 106 represents a process for inputting temperature data to another configuration. At the time of execution of a collaborative function, temperature data is input from the sensor A to the application 1.

The size of the configuration image may be changed in three or more levels, and an arrow image of a type corresponding to the size in each level may be displayed. In a case where the size of the configuration image at a point of an arrow image is changed, the type of the arrow image connected to the configuration image may also be changed.

In a case where a user gives an instruction for setting a collaborative function by operating the UI unit 20, the setting unit 28 registers, in the setting details management information, a data input process represented by an arrow image used for connection between configuration images at the time point when the setting instruction is given, as a process included in the collaborative function. Then, in a case where the user changes a type of the arrow image by changing a size of a configuration image, the setting unit 28 changes the registered input process to a data input process represented by the arrow image after change. Thus, setting details of the registered collaborative function are changed.

In addition, the setting unit 28 may change a function to be executed by a configuration associated with the configuration image in accordance with the size of the configuration image. Setting details of a collaborative function may also be changed by such an operation.

Furthermore, the type of the arrow image and the setting details of the collaborative function may also be changed in accordance with color or a shape of a configuration image. The type of the arrow image and the setting details of the collaborative function may also be changed in accordance with a combination of two or more of a distance between configuration images, a angular relationship between configuration images, a size of a configuration image, color of a configuration image, and a shape of a configuration image.

Also in the exemplary embodiment described above with reference to FIG. 4 and the like, the type of the arrow image and the setting details of the collaborative function may also be changed in accordance with a distance between configuration images, an angular relationship between configuration images, a size of a configuration image, color of a configuration image, and a shape of a configuration image.

Although arrow images as connection lines are displayed after configuration images have been connected to each other via the arrow images in the exemplary embodiment described above, the arrow images do not have to be displayed even in a case where configuration images are connected to each other via the arrow images. For example, while a user operates an arrow image, the display control unit 26 causes the display unit to display the arrow image. When the user connects the arrow image to configuration images, the display control unit 26 no longer displays the arrow image. In this case, the display control unit 26 may cause a character string, a symbol, or the like to be displayed between a plurality of configuration images that are connected to each other via the arrow image, the character string, the symbol, or the like indicating output details represented by the arrow image. For example, in the example illustrated in FIG. 4, the display control unit 26 may cause a character string to be displayed between the device image 40 and the software image 42, the character string indicating that data to be input from the sensor A to the application 1 is humidity data (the character string is "humidity data" or a symbol, for example), without displaying the arrow image 56 on the screen 30. The same applies to the other arrow images. Thus, even in a case where an arrow image is not displayed after configuration images have been connected to each other, a type of data to be input from a configuration at a nock of an arrow image to a configuration at a point of the arrow image is presented to the user. This way of display corresponds to an example of the display of connection. Note that also in a case where a user connects the configuration images to each other, a character string, a symbol, or the like indicating data may be displayed without displaying an arrow image. In this case, by changing the character string, the symbol, or the like, the user may change the data to be input.

Figure 18:
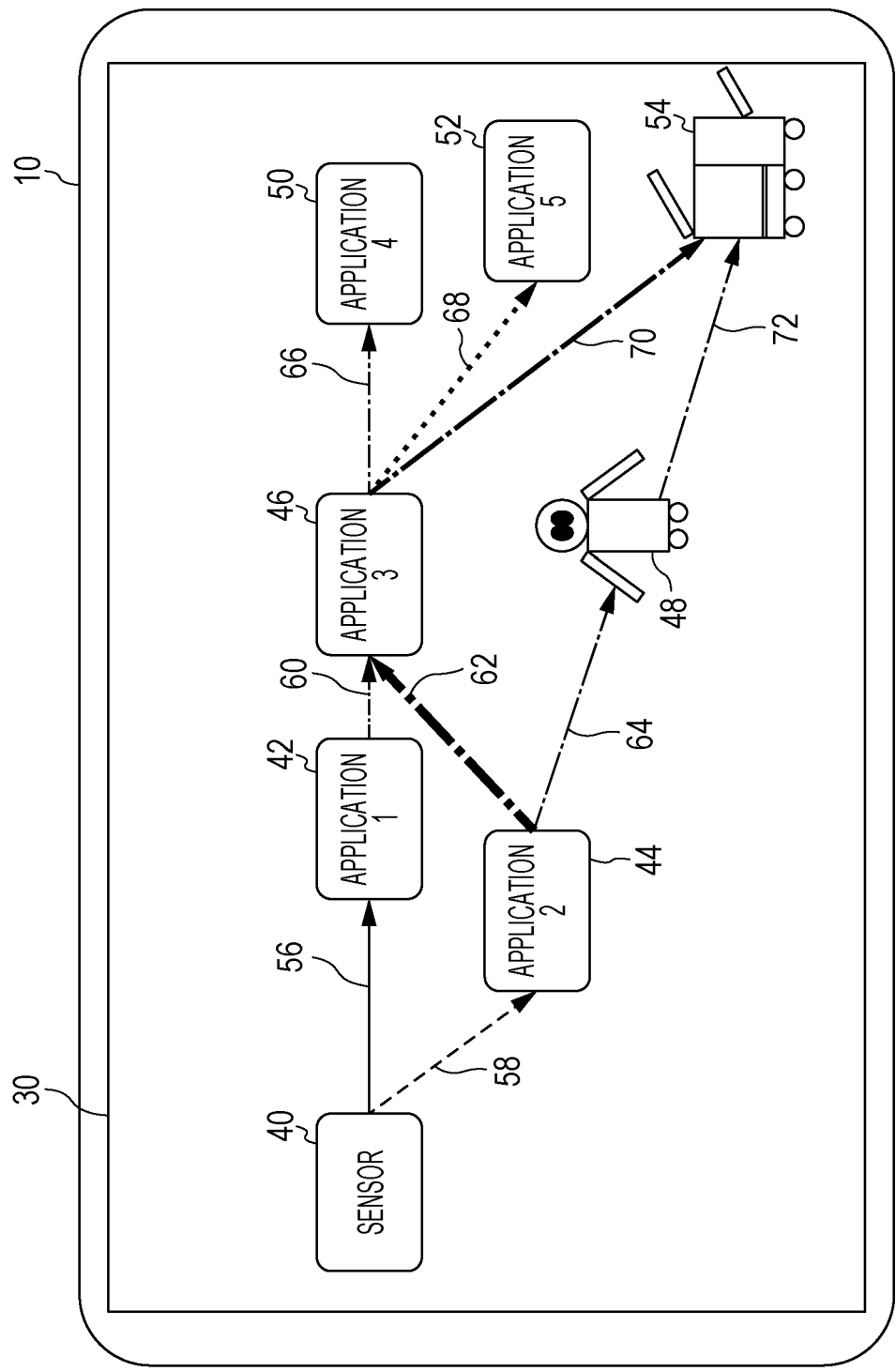
FIG. 18 illustrates a screen.

Although the input display regions and the output display region are provided on the screen in the exemplary embodiment described above, these display regions do not have to be provided. For example, as illustrated in FIG. 18, a plurality of configuration images are displayed on the screen 30, and as in the above-described exemplary embodiment, collaborative functions may be set by connecting the configuration images to each other via arrow images. Also in this case, data is input from a configuration associated with a configuration image at a nock of an arrow image to a configuration associated with a configuration image at a point of the arrow image.

Now, a setting details management table as an example of the setting details management information will be described with reference to FIG. 19. FIG. 19 illustrates an example of the setting details management table. In the setting details management table, as an example, an ID, configuration identification information for identifying configurations to be used for a collaborative function, and information indicating setting details of the collaborative function correspond with one another.

A collaborative function with an ID "1" is a collaborative function that is executable by using the multi-function peripheral B and a presentation application P. A collaborative function with ID "2" is a collaborative function that is executable by using the multi-function peripheral B and an address management application Q. A collaborative function with an ID "3" is a collaborative function that is executable by using the main part B1 of the multi-function peripheral B and a PC (D). A collaborative function with an ID "4" is a collaborative function that is executable by using a document creation application G and a form creation application N. A collaborative function with an ID "5" is a collaborative function that is executable by using the multi-function peripheral B and the form creation application N. A collaborative function with an ID "6" is a collaborative function that is executable by using a door opening-and-closing sensor B and a lighting apparatus F.

The collaborative functions illustrated in FIG. 19 are merely examples, and other collaborative functions may also be set.

At the time of execution of a collaborative function, the terminal apparatus 10 or a relay device refers to the above setting details management table to identify a plurality of configurations to used for the collaborative function and transmits control information indicating an instruction for executing the collaborative function to the plurality of configurations. Upon reception of the control information, the configurations execute processes that are assigned to the corresponding configurations in accordance with the control information. Thus, the collaborative function is executed.

The above terminal apparatus 10 and devices 12 are achieved by cooperation of hardware and software, for example. Specifically, the terminal apparatus 10 and each of the devices 12 have one or more processors (not shown) such as a CPU. By the one or more processors reading and executing a program stored in a storage apparatus (not shown), functions of units of the terminal apparatus 10 and each of the devices 12 are implemented. The program is stored in the storage apparatus via a recording medium such as a compact disc (CD) or digital versatile disc (DVD) or via a communication path such as a network. As another example, the units of the terminal apparatus 10 and each of the devices 12 may be implemented by hardware resources such as a processor, an electronic circuit, and an application specific integrated circuit (ASIC). A device such as a memory may be used for the implementation. As still another example, the units of the terminal apparatus 10 and each of the devices 12 may be implemented by a digital signal processor (DSP), a field programmable gate array (FPGA), or the like.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents

What is claimed:

1. An information processing apparatus comprising:
a control unit that changes between a first setting and a second setting of a collaborative function, the second setting being different from the first setting, the collaborative function being performed at least by a sensor and a plurality of applications, at least one of a display position of an image and display of connection between images, the image and the images each being associated with a function to be used for the collaborative function, the collaborative function being a function different from a first function of a first device and a second function of a second device, the collaborative function only becoming executable by collaboration between the first device and the second device,
wherein the control unit further changes an execution timing of the collaborative function in accordance with a distance between the images based upon a timing at which the sensor executes a process associated with an application of the plurality of applications, whereby the longer the distance is between the images, the longer the period of time is before execution of the collaborative function.

2. The information processing apparatus according to claim 1, wherein
the control unit further changes the display position of the image in accordance with the change in the execution timing.

3. The information processing apparatus according to claim 1, wherein
the control unit changes the execution timing of the collaborative function in accordance with a length of a line that connects the images to each other.

4. The information processing apparatus according to claim 1, wherein
the control unit changes between the first setting and the second setting, a type of a line that connects the images to each other.

5. The information processing apparatus according to claim 4, wherein
the control unit further controls display of a candidate for the line.

6. The information processing apparatus according to claim 5, wherein
the control unit changes the candidate for the line in accordance with a candidate for another image that is to be connected to the image.

7. The information processing apparatus according to claim 3, wherein
if a user specifies the line that connects the images to each other, the control unit further controls display of information for changing the line.

8. The information processing apparatus according to claim 1, wherein
the control unit changes between the first setting and the second setting, a relationship between display positions of the images.

9. The information processing apparatus according to claim 8, wherein
the control unit changes an angular relationship between the images as the relationship between the display positions.

10. The information processing apparatus according to claim 1, wherein
the control unit changes, in accordance with a thickness of a line that connects the images to each other, a communication performance when data is transmitted.

11. The information processing apparatus according to claim 1, wherein
the control unit changes a setting of the collaborative function in accordance with a connection portion in the image.

12. The information processing apparatus according to claim 1, wherein
if a role is associated with the image, the control unit further changes a setting of the collaborative function in accordance with the role.

13. The information processing apparatus according to claim 12, wherein
the control unit associates, with the image, the role in accordance with the display position of the image.

14. The information processing apparatus according to claim 13, wherein
if the image is displayed in a display region with which the role is associated, the control unit associates the role with the image.

15. An information processing apparatus comprising:
a control unit that changes between a first setting and a second setting of a collaborative function, the second setting being different from the first setting, the collaborative function being performed at least by a sensor and a plurality of applications, at least one of a display position of an image and display of connection between images, the image and the images each being associated with a device to be used for the collaborative function, the collaborative function being a function different from a first function of a first device and a second function of a second device, the collaborative function only becoming executable by collaboration between the first device and the second device,
wherein the control unit further changes an execution timing of the collaborative function in accordance with a distance between the images based upon a timing at which the sensor executes a process associated with an application of the plurality of applications, whereby the longer the distance is between the images, the longer the period of time is before execution of the collaborative function.

16. A non-transitory computer readable medium storing a program causing a computer to execute a process for information processing, the process comprising:
changing between a first setting and a second setting of a collaborative function, the second setting being different from the first setting, the collaborative function being performed at least by a sensor and a plurality of applications, at least one of a display position of an image and display of connection between images, the image and the images each being associated with a function to be used for the collaborative function, the collaborative function being a function different from a first function of a first device and a second function of a second device, the collaborative function only becoming executable by collaboration between the first device and the second device; and
changing an execution timing of the collaborative function in accordance with a distance between the images based upon a timing at which the sensor executes a process associated with an application of the plurality of applications, whereby the longer the distance is between the images, the longer the period of time is before execution of the collaborative function.

17. A non-transitory computer readable medium storing a program causing a computer to execute a process for information processing, the process comprising:
changing between a first setting and a second setting of a collaborative function, the second setting being different from the first setting, the collaborative function being performed at least by a sensor and a plurality of applications, at least one of a display position of an image and display of connection between images, the image and the images each being associated with a device to be used for the collaborative function, the collaborative function being a function different from a first function of a first device and a second function of a second device, the collaborative function only becoming executable by collaboration between the first device and the second device; and
changing an execution timing of the collaborative function in accordance with a distance between the images based upon a timing at which the sensor executes a process associated with an application of the plurality of applications, whereby the longer the distance is between the images, the longer the period of time is before execution of the collaborative function.

* * * * *